United States Patent
Kim et al.

(10) Patent No.: US 11,912,189 B2
(45) Date of Patent: Feb. 27, 2024

(54) VEHICLE CUP HOLDER ALLOWING WIRELESS CHARGING

(71) Applicant: AMOSENSE CO., LTD., Cheonan-si (KR)

(72) Inventors: Chol Han Kim, Incheon (KR); Bo Hyeon Han, Goyang-si (KR); Bong Sik Woo, Gimpo-si (KR); Bae Geun Lee, Suwon-si (KR)

(73) Assignee: Amosense Co., Ltd., Cheonan-si (KR)

( * ) Notice: Subject to any disclaimer, the term of this patent is extended or adjusted under 35 U.S.C. 154(b) by 564 days.

(21) Appl. No.: 17/261,094

(22) PCT Filed: Jul. 19, 2019

(86) PCT No.: PCT/KR2019/008977
§ 371 (c)(1),
(2) Date: Jan. 18, 2021

(87) PCT Pub. No.: WO2020/017933
PCT Pub. Date: Jan. 23, 2020

(65) Prior Publication Data
US 2021/0316648 A1 Oct. 14, 2021

(30) Foreign Application Priority Data

Jul. 20, 2018 (KR) .................. 10-2018-0084793
Oct. 19, 2018 (KR) .................. 10-2018-0125253
(Continued)

(51) Int. Cl.
*B60N 3/10* (2006.01)
*H02J 50/10* (2016.01)
(Continued)

(52) U.S. Cl.
CPC .............. *B60N 3/101* (2013.01); *B60N 3/105* (2013.01); *H02J 50/10* (2016.02); *H02J 7/02* (2013.01); *H02J 50/40* (2016.02)

(58) Field of Classification Search
CPC .......... B60N 3/101; B60N 3/10; B60N 3/105; B60N 3/104; B60N 3/107; B60R 16/037;
(Continued)

(56) References Cited

U.S. PATENT DOCUMENTS 6,670,583 B2  12/2003  Kara
7,140,073 B2  11/2006  Park et al.
(Continued)

FOREIGN PATENT DOCUMENTS

CN    102630359 A    8/2012
CN    203496728 U    3/2014
(Continued)

OTHER PUBLICATIONS

Yun et al., KR 20140045126 A, machine translation, Apr. 16, 2014 (Year: 2014).*
(Continued)

*Primary Examiner* — Amy R Weisberg
*Assistant Examiner* — Wenwei Zhuo
(74) *Attorney, Agent, or Firm* — ROTHWELL, FIGG, ERNST & MANBECK, P.C.

(57) ABSTRACT

Provided is a vehicle cup holder allowing wireless charging. A vehicle cup holder allowing wireless charging according to an embodiment of the present invention comprises: a housing having an accommodation space for accommodating objects, including a portable telephone; a support member coupled to the housing by means of a rotational shaft to allow rotation in the accommodation space, and comprising a wireless transmission module for wirelessly charging the battery of a portable telephone; and a driving member
(Continued)

allowing or disallowing rotation of the rotational shaft so as to maintain the support member in a first state in which a portable telephone can be charged, or in a second state in which an object can be accommodated in the accommodation space.

15 Claims, 20 Drawing Sheets

(30) Foreign Application Priority Data

| Mar. 14, 2019 | (KR) | 10-2019-0029304 |
|---|---|---|
| Apr. 29, 2019 | (KR) | 10-2019-0049925 |
| May 16, 2019 | (KR) | 10-2019-0057502 |
| Jul. 19, 2019 | (KR) | 10-2019-0087666 |

(51) Int. Cl.
  *H02J 50/40* (2016.01)
  *H02J 7/02* (2016.01)

(58) Field of Classification Search
  CPC ..... B60R 16/02; B60R 16/03; B60R 11/0241; H02J 7/02; H02J 7/0044; H02J 50/10
  USPC ........... 296/37.8, 24.34, 37.12, 37.13, 37.14, 296/37.15
  See application file for complete search history.

(56) References Cited

U.S. PATENT DOCUMENTS

| 8,541,974 | B2* | 9/2013 | Farahani | H02J 7/0044 |
|---|---|---|---|---|
| | | | | 320/108 |
| 8,816,636 | B2 | 8/2014 | Shinde et al. | |
| 10,128,671 | B2 | 11/2018 | Yu | |
| 11,117,506 | B2* | 9/2021 | Fukui | B60R 11/02 |
| 2011/0062916 | A1 | 3/2011 | Farahani | |
| 2011/0156637 | A1 | 6/2011 | Thorsell et al. | |
| 2014/0312686 | A1* | 10/2014 | Shraga | H02J 50/80 |
| | | | | 307/10.1 |
| 2016/0336789 | A1* | 11/2016 | Hyun | H02J 7/0044 |
| 2016/0356744 | A1 | 12/2016 | Sinha et al. | |
| 2016/0365744 | A1* | 12/2016 | Hyun | H02J 50/10 |
| 2017/0054320 | A1 | 2/2017 | Yamanishi et al. | |
| 2017/0201115 | A1* | 7/2017 | Stickley | H04M 19/00 |
| 2018/0152033 | A1 | 5/2018 | Dalsoo et al. | |
| 2019/0305577 | A1* | 10/2019 | Yi | H02J 50/10 |
| 2019/0315287 | A1 | 10/2019 | Bober et al. | |
| 2020/0101886 | A1* | 4/2020 | Shibata | H02J 50/10 |
| 2023/0060215 | A1* | 3/2023 | Otake | H02J 50/005 |

FOREIGN PATENT DOCUMENTS

| CN | 103840532 A | 6/2014 |
|---|---|---|
| CN | 104779655 A | 7/2015 |
| CN | 206714564 U | 12/2017 |
| CN | 218569918 U | 3/2023 |
| JP | 2010-235066 A | 10/2010 |
| KR | 2014-0035676 A | 3/2014 |
| KR | 20140035676 A * | 3/2014 |
| KR | 10-2014-0045126 A | 4/2014 |
| KR | 2014-0045126 A | 4/2014 |
| KR | 20140045126 A * | 4/2014 |
| KR | 10-2014-0091266 A | 7/2014 |
| KR | 10-1461101 B | 11/2014 |
| KR | 10-2015-0033305 A | 4/2015 |
| KR | 10-2015-0063821 A | 6/2015 |
| KR | 10-2015-00842210 A | 7/2015 |
| KR | 10-1665247 B1 | 10/2016 |
| KR | 101665247 B1 * | 10/2016 |
| KR | 10-2016-0146478 A | 12/2016 |
| KR | 10-2017-0020058 A | 2/2017 |
| KR | 10-2017-0028137 A | 3/2017 |
| KR | 10-1845832 B1 | 4/2018 |
| WO | 2015177994 A1 | 11/2015 |
| WO | 2016-056793 A1 | 4/2016 |

OTHER PUBLICATIONS

International Search Report cited in PCT/KR2019/008977 dated Nov. 6, 2019, 2 pages.
Office Action for copending U.S. Appl. No. 17/261,093 dated Sep. 14, 2023. (12 pp).

* cited by examiner

VEHICLE CUP HOLDER ALLOWING WIRELESS CHARGING

CROSS REFERENCE TO RELATED APPLICATION

This application is a 35 U.S.C. 371 National Phase Entry Application of PCT/KR2019/008977, filed Jul. 19, 2019, which claims the benefit of Korean Patent Application No. 10-2018-0084793 filed on Jul. 20, 2018; Korean Patent Application No. 10-2018-0125253 filed Oct. 19, 2018; Korean Patent Application No. 10-2019-0029304 filed Mar. 14, 2019; Korean Patent Application No. 10-2019-0049925 filed Apr. 29, 2019; Korean Patent Application No. 10-2019-0057502 filed May 16, 2019; Korean Patent Application No. 10-2019-0087666 filed Jul. 19, 2019, the disclosures of which are incorporated herein in their entirety by reference.

TECHNICAL FIELD

The present invention relates to a vehicle cup holder, and more particularly, to a vehicle cup holder allowing wireless charging.

BACKGROUND

Recently, with the increase in the spread of portable terminals to which embedded batteries are applied, various types of chargers for charging portable terminals in vehicles are being sold.

In general, a vehicle provides a universal serial bus (USB) port for connecting a charging cable, and a portable terminal is connected to the USB port through the charging cable to charge a battery.

However, a charging structure using a charging cable has a problem in that charging efficiency is degraded due to the abrasion of a charging port of a portable terminal caused by the connection, disconnection of the charging cable or the introduction of foreign materials into the charging port, or the like.

Recently, in order to solve a problem of a charging structure using a charging cable, technology for wirelessly charging a battery of a portable terminal through wireless power transmission has been developed.

As a part of the wireless power transmission, a wireless charging device in the form that is inserted into a vehicle cup holder has been developed, but there is a problem in that a space for mounting an actual cup is insufficient due to a structure in which the wireless charging device in the form of a cup is inserted into the cup holder.

SUMMARY OF THE INVENTION

The present invention is directed to providing a vehicle cup holder allowing wireless charging, which performs additionally has a charging function capable of wirelessly charging a battery of a portable terminal as well as an original function as a cup holder of accommodating an object.

The present invention is also directed to providing a vehicle cup holder allowing wireless charging, in which it is possible to minimize a load generated in a rotation shaft when a state is converted into a first state for wireless charging and a second state for accommodating an object.

The present invention is also directed to providing a vehicle cup holder allowing wireless charging which is capable of supplying wireless power to an object capable of receiving wireless power other than a portable terminal.

The present invention is also directed to providing a vehicle cup holder allowing wireless charging which is capable of performing a wireless charging function in a state in which a portable terminal is disposed in a direction desired by a user.

One aspect of the present invention provides a vehicle cup holder allowing wireless charging including a housing which has an accommodation space, in which an object including a portable terminal is accommodated, formed therein, a mounting member which is coupled to the housing through a rotation shaft so as to be rotatable in the accommodation space and which includes a wireless power transmission module configured to wirelessly charge a battery of the portable terminal, and an operation member which allows or restricts rotation of the rotation shaft to maintain the mounting member in a first state in which the battery of the portable terminal is charged or maintain the mounting member in a second state in which the object is accommodated in the accommodation space.

The first state may be a state in which the mounting member is disposed to be inclined at an acute angle with respect to a bottom surface or a side surface of the accommodation space such that one surface of the mounting member supports one surface of the portable terminal, and the second state may be a state in which the mounting member is disposed parallel to the side surface of the accommodation space such that the object is inserted into the accommodation space.

The mounting member may include a first mounting member and a second mounting member which are separately rotated in different directions in the accommodation space.

The first and second mounting members may be disposed to be positioned on opposite surfaces facing each other in the accommodation space.

The rotation shaft may include a first rotation shaft and a second rotation shaft which protrude outward from both sides of the mounting member by a predetermined length, the housing may include a plurality of locking grooves formed such that partial lengths of the first and second rotation shafts are inserted therein, and the first rotation shaft and the second rotation shaft may be latched and installed in sleeve rings mounted in the housing.

The sleeve ring may be installed in the locking groove such that a portion thereof protrudes inside the locking groove along the locking groove.

The sleeve ring may have an opening of which one side is open, and circumference surfaces of the first rotation shaft and the second rotation shaft may be partially supported directly by inner surfaces of the sleeve rings protruding inside the locking grooves.

The first rotation shaft and the second rotation shaft may include seating grooves recessed inward in a circumferential direction thereof, and the first and second rotation shafts may be latched and installed in the sleeve rings through the seating grooves.

The operation member may include a push button slidably coupled to the housing, a through-hole, through which the second rotation shaft passes, formed to pass through the push button, and a stepped portion formed on an inner circumferential surface of the through-hole such that a portion of the second rotation shaft is selectively latched and installed.

The vehicle cup holder may further include a spring member configured to press the push button in one direction.

The vehicle cup holder may further include a torsion spring coupled to the first rotation shaft so as to provide an elastic force for rotating the first rotation shaft in one direction.

The vehicle cup holder may further include a plurality of cutout portions formed to be cut inward along an outer circumferential surface of the second rotation shaft, wherein the stepped portion is engaged with any one of the plurality of cutout portions to restrict rotation of the second rotation shaft in one direction.

The mounting member may include a case having an interior space in which the wireless power transmission module is disposed, and a connection board disposed in the interior space and electrically connected to the wireless power transmission module, the rotation shaft may have a through-hole formed to pass therethrough in a length direction thereof, and the connection board may include a first part disposed in the interior space and a second part disposed to pass through the through-hole such that a portion thereof is exposed to the outside and a cable is connected thereto.

The mounting member may include at least one protrusion protruding from an inner surface of the case so as to support one surface of the wireless power transmission module.

The vehicle cup holder may further include another wireless power transmission module embedded in a bottom surface of the accommodation space, wherein, in a state in which the mounting member maintains the second state, the another wireless power transmission module may transmit wireless power to the object inserted into the accommodation space.

The housing may include an inclined surface formed to be inclined at a predetermined angle at an edge of the accommodation space so as to be in contact with one surface of the mounting member in the first state to limit a rotation angle of the mounting member.

Advantageous Effects

According to the present invention, in a state in which a vehicle cup holder supports a portable terminal, an angle of a mounting member for charging a battery of the portable terminal can be changed through the rotation of the mounting member, and thus, the vehicle cup holder can smoothly perform both of an original function (first function) as a cup holder of accommodating an object such as a cup or a tumbler and a second function of wirelessly charging the battery of the portable terminal.

In addition, according to the present invention, a rotation shaft is supported through a sleeve ring to minimize a contact area of the rotation shaft, thereby smoothly converting a state of a mounting member. Thus, a user can easily change an angle of the mounting member even when using a small force.

Moreover, according to the present invention, a wireless charging function can be performed in a state in which a mobile terminal is disposed in a direction desired by the user, thereby improving user convenience.

DETAILED DESCRIPTION

Figure 1:
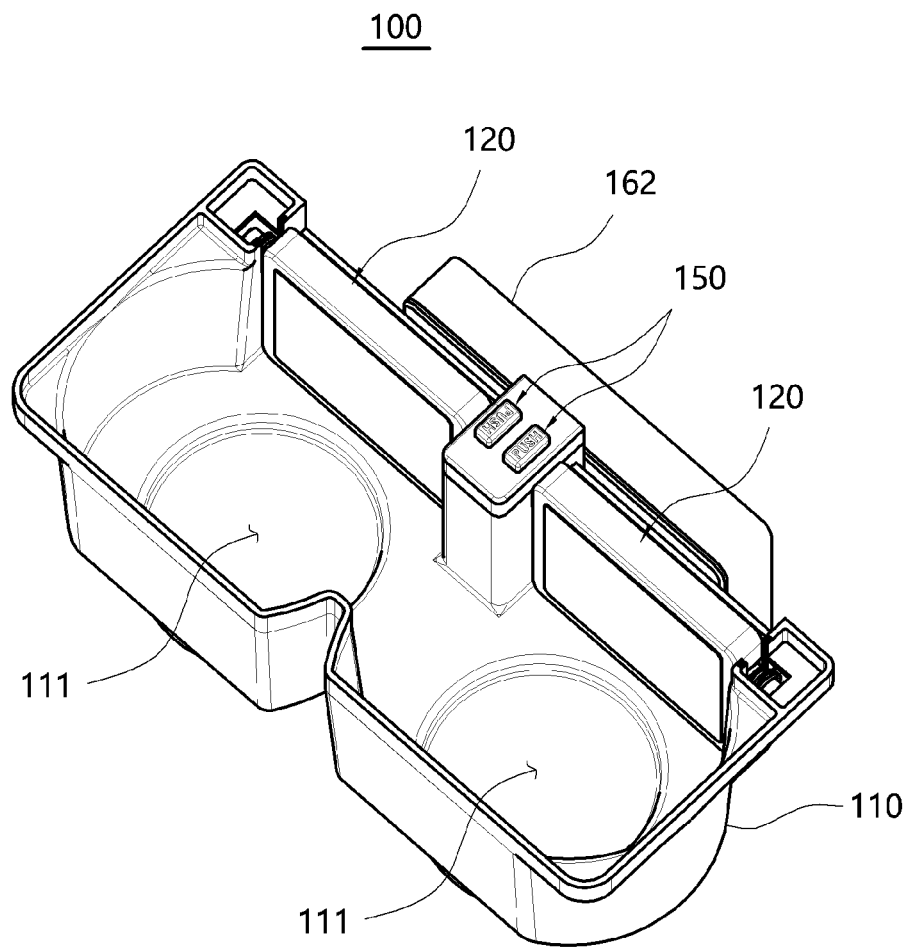
FIG. 1 is a view illustrating a vehicle cup holder allowing wireless charging according to one embodiment of the present invention.

Hereinafter, embodiments of the present invention will be described in detail with reference to the accompanying drawings so as to be easily practiced by a person of ordinary skill in the art to which the present invention pertains. It should be understood that the present invention may be embodied in various different forms and is not limited to the following embodiments. Any redundant descriptions of well-known parts will be omitted in drawings for clarity, and like reference numerals refer to like elements throughout the specification.

Figure 7:
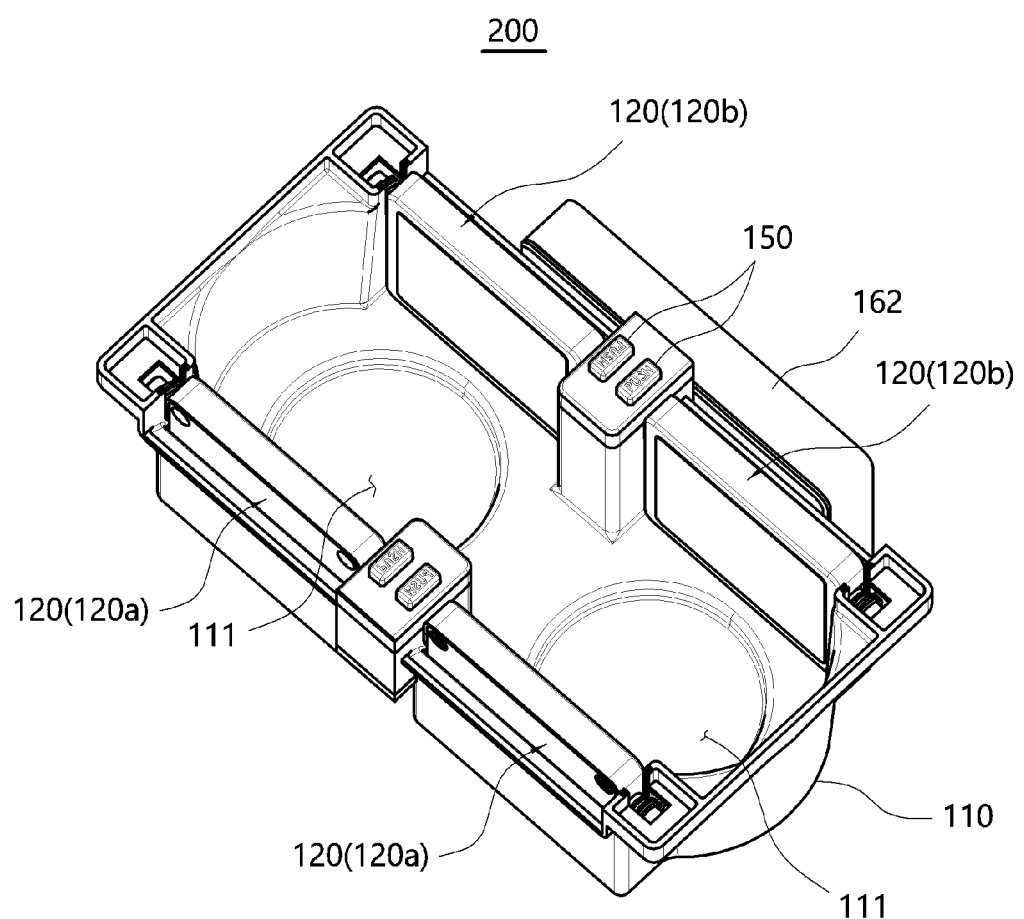
FIG. 7 is a view illustrating a vehicle cup holder allowing wireless charging according to another embodiment of the present invention.

A vehicle cup holder 100 or 200 (hereinafter, referred to as "cup holder") allowing wireless charging according to one embodiment of the present invention includes a housing 110, a mounting member 120, and operations member 150 as shown in FIGS. 1 and 7.

The housing 110 may have one or more first accommodation spaces 111 for accommodating an object including a portable terminal 10. That is, the one or more first accommodation spaces 111 may be formed to be recessed downward from an upper surface of the housing 110 by a predetermined depth, and an upper portion thereof may be open.

Figure 2:
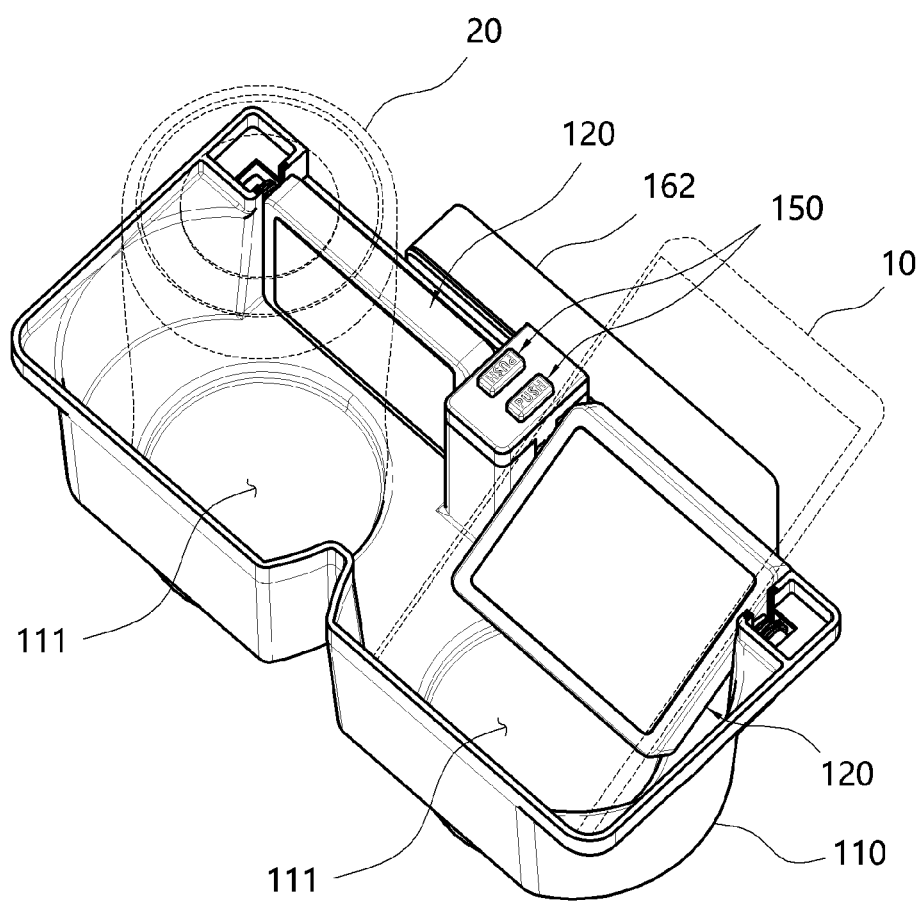
FIG. 2 is an operating state view of FIG. 1.

Accordingly, as shown in FIG. 2, the object may be introduced through the open upper portion of the first accommodation space 111 and accommodated in the first accommodation space 111.

Two first accommodation spaces 111 may be provided so as to be adjacent to each other in one direction of the housing 110. However, the total number of the first accommodation spaces 111 is not limited thereto, and the total number of the first accommodation spaces 111 may be appropriately changed.

Here, the object may be a portable object such as the portable terminal 10, a cup, or a tumbler 20 or may be various objects that can be accommodated in a well-known vehicle cup holder. In addition, the cup may be a container such as a general paper cup, a plastic cup, or a tumbler that can hold a liquid such as water or coffee.

The mounting member 120 may be formed in a plate shape having a predetermined area and may be disposed in the first accommodation space 111. The mounting member 120 may be coupled to the housing 110 through one or more rotation shafts 141 and 142 so as to be rotated in the first accommodation space 111.

Thus, as shown in FIGS. 1 and 7, the mounting member 120 may be converted into a first state in which one surface thereof is inclined and disposed to form an acute angle θ (for example, 55 degrees) with a bottom surface or side surface of the first accommodation space 111 or may be converted into a second state in which one surface thereof is disposed to be parallel to and face the side surface of the first accommodation space 111. Here, the second state may be a state in which one surface of the mounting member 120 is perpendicular to the bottom surface of the first accommodation space 111.

Accordingly, in the cup holder 100 or 200 according to one embodiment of the present invention, when the mounting member 120 maintains the first state in the first accommodation space 111, the mounting member 120 may support one surface of an object such as a portable terminal. Therefore, the cup holder 100 or 200 according to one embodiment of the present invention may mount the object such as the portable terminal.

Figure 17:
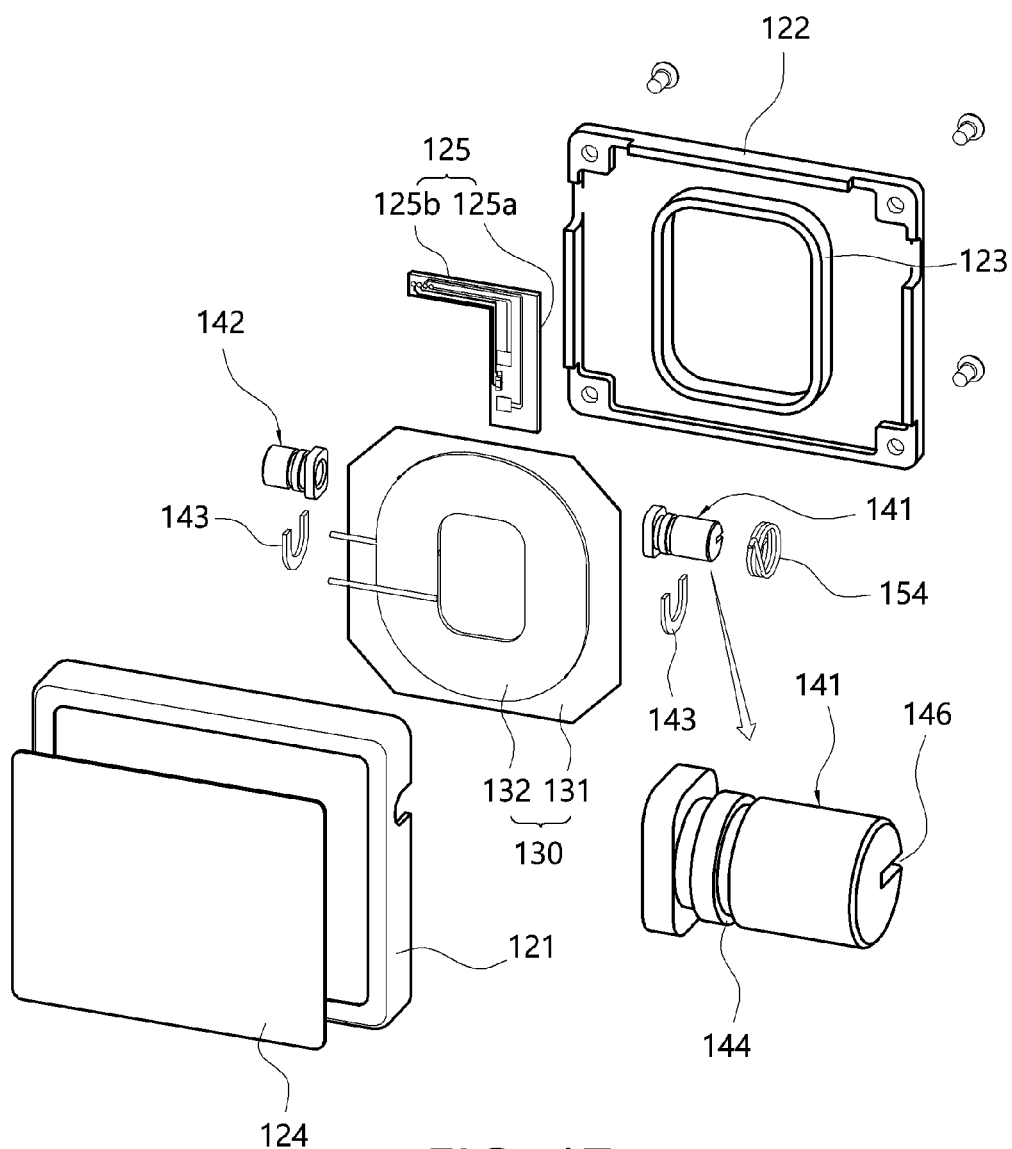
FIG. 17 is an exploded view of FIGS. 15A-15B.

Here, as shown in FIG. 17, a slip prevention pad 124 may be provided on one surface of the mounting member 120. Thus, when the mounting member 120 mounts an object in the first state, the object mounted on the mounting member 120 may be prevented from slipping or being moved. Accordingly, the mounting member 120 may stably mount the object.

In addition, in the cup holder 100 or 200 according to one embodiment of the present invention, when the mounting member 120 maintains the second state in the first accommodation space 111, the first accommodation space 111 may secure an adequate space. Thus, the cup holder 100 or 200 according to one embodiment of the present invention may perform an original function (first function) as a holder to accommodate a cup, a tumbler, or the like in the first accommodation space 111.

Figure 3:
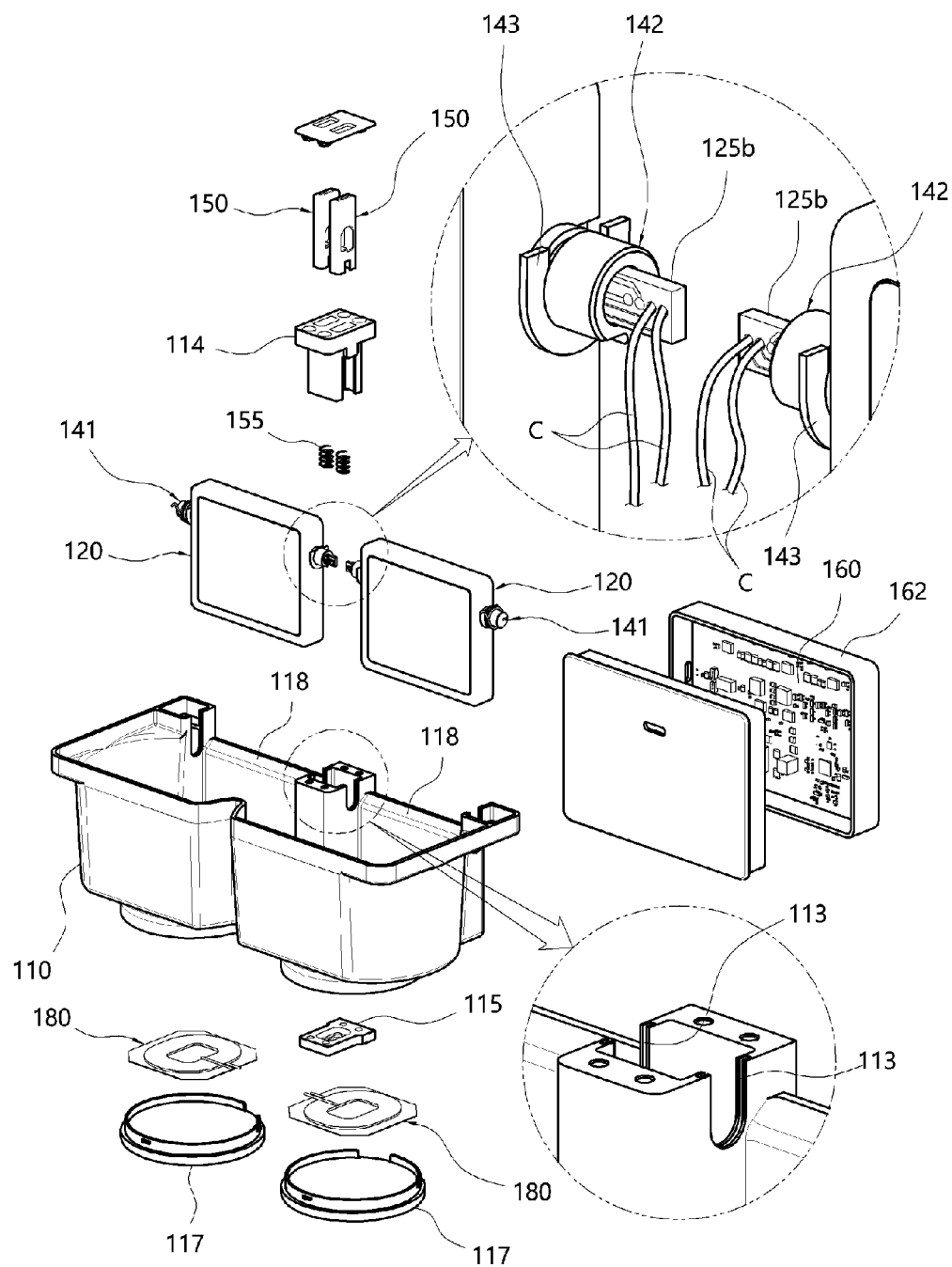
FIG. 3 is an exploded view of FIG. 1.
Figure 8:
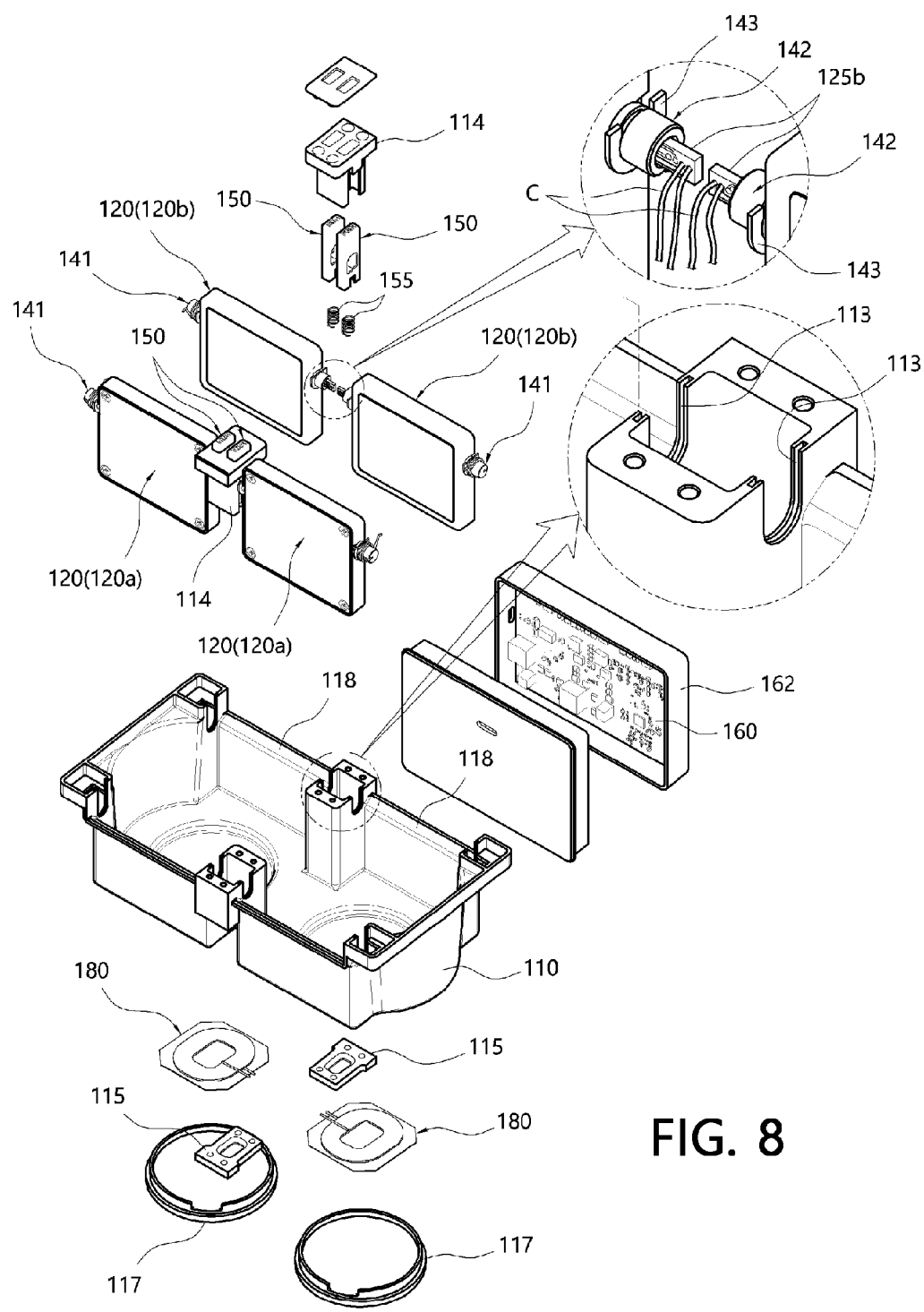
FIG. 8 is an exploded view of FIG. 7.

To this end, as shown in FIGS. 3 and 8, the mounting member 120 may be rotatably coupled to the housing 110 through a first rotation shaft 141 and a second rotation shaft 142

Here, the first rotation shaft 141 and the second rotation shaft 142 may have one end portion fixed to the mounting member 120 and the other end portion protruding outward from an end portion of the mounting member 120 by a predetermined length.

In this case, the housing 110 may include a plurality of locking grooves 113 for accommodating a portion of the first rotation shaft 141 and a portion of the second rotation shaft 142, and the first rotation shaft 141 and the second rotation shaft 142 may be latched and installed in the plurality of locking grooves 113.

Thus, when the first rotation shaft 141 and the second rotation shaft 142 are rotated, the mounting member 120 may be rotated about the first rotation shaft 141 and the second rotation shaft 142 in the same direction as a rotation direction of the first rotation shaft 141 and the second rotation shaft 142.

As an example, as shown in FIGS. 3 and 8, the plurality of locking grooves 113 may be formed in the housing 110 and may be formed to communicate with the first accommodation space 111.

Figure 4:
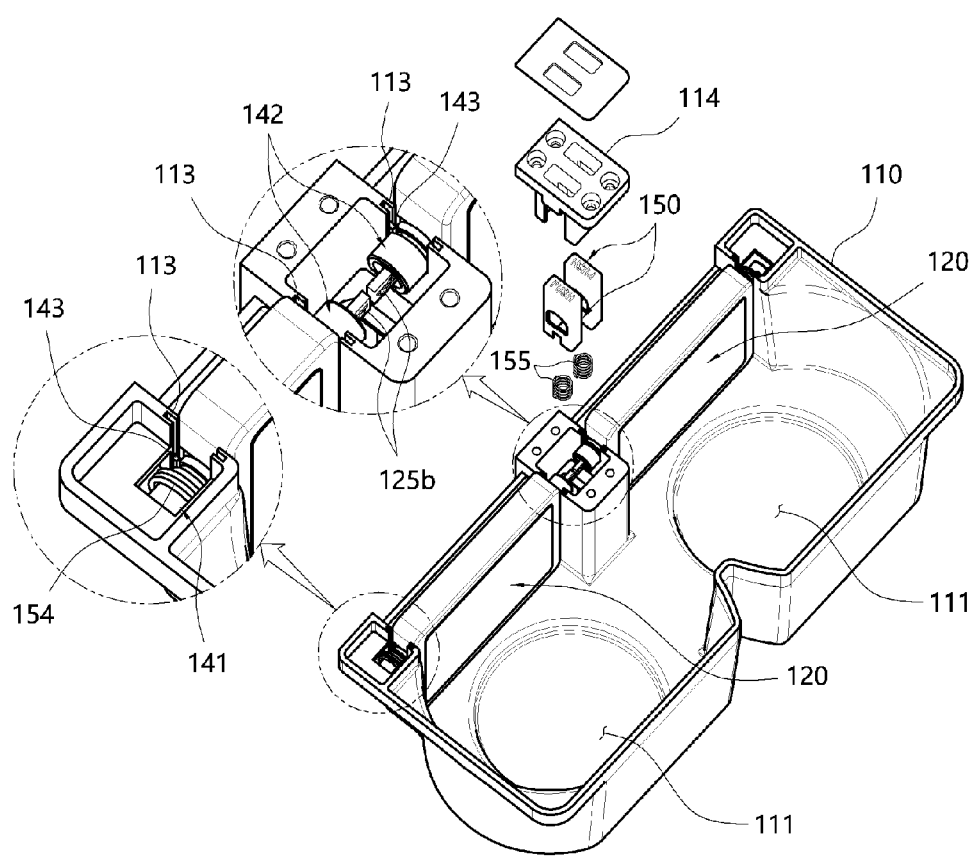
FIG. 4 is a view illustrating a coupling relationship between a rotation shaft and a housing in the vehicle cup holder allowing wireless charging according to one embodiment of the present invention.
Figure 9:
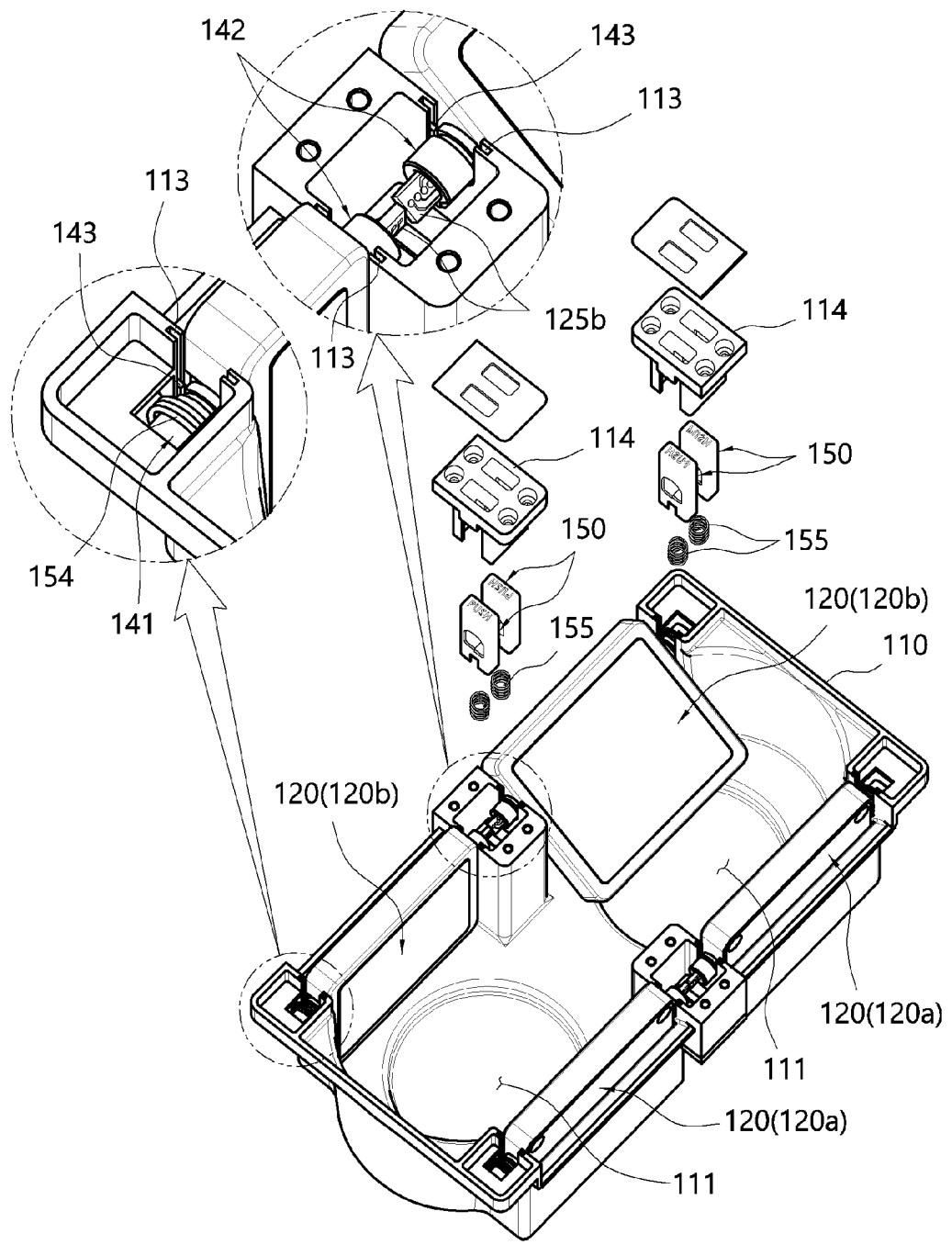
FIG. 9 is a view illustrating a coupling relationship between a rotation shaft and a housing in FIG. 7.

As a non-limiting example, as shown in FIGS. 4 and 9, the plurality of locking grooves 113 may be formed to be recessed downward from the upper surface of the housing 110 by a predetermined depth and may have an upper portion that is open like a "U" shape.

Thus, partial lengths of the first rotation shaft 141 and the second rotation shaft 142 protruding from the mounting member 120 may be latched and installed in the locking grooves 113 corresponding thereto, and the first rotation shaft 141 and the second rotation shaft 142 may be rotated in the locking grooves 113.

In this case, in the cup holder 100 or 200 according to one embodiment of the present invention, in order to minimize a load generated in the first rotation shaft 141 and the second rotation shaft 142 when the mounting member 120 is rotated, the first rotation shaft 141 and the second rotation shaft 142 may be latched and installed in the locking grooves 113.

To this end, sleeve rings 143 may be installed in the plurality of locking grooves 113, and the sleeve ring 143 may be installed in the locking groove 113 so as to partially protrude inside the locking groove 113 by a predetermined length along the locking groove 113.

As an example, the sleeve ring 143 may include an opening with one side that is open like an approximately "U" shape and may be formed as a thin plate.

In this case, the sleeve ring 143 may be installed in the locking groove 113 such that an inner surface of the sleeve ring 143 protrudes inside the locking groove 113 by a predetermined length.

Accordingly, in a state in which the sleeve ring 143 is installed in the locking groove 113, when partial lengths of the first rotation shaft 141 and the second rotation shaft 142 protruding from the mounting member 120 are inserted into the locking grooves 113, a circumference surface of each of the first rotation shaft 141 and the second rotation shaft 142 may be partially supported directly by the inner surface of the sleeve ring 143 protruding inside the locking groove 113.

Accordingly, it is possible to minimize a contact area of the first and second rotation shafts 141 and 142 in contact with the sleeve ring 143. Accordingly, when the first rotation shaft 141 and the second rotation shaft 142 are rotated by an external force, a load generated in the first rotation shaft 141 and the second rotation shaft 142 can be minimized, and even when a minimum external force is applied, the first rotation shaft 141 and the second rotation shaft 142 can be smoothly rotated. Thus, the mounting member 120 can be smoothly rotated around the first and second rotation shafts 141 and 142.

Figure 15A:
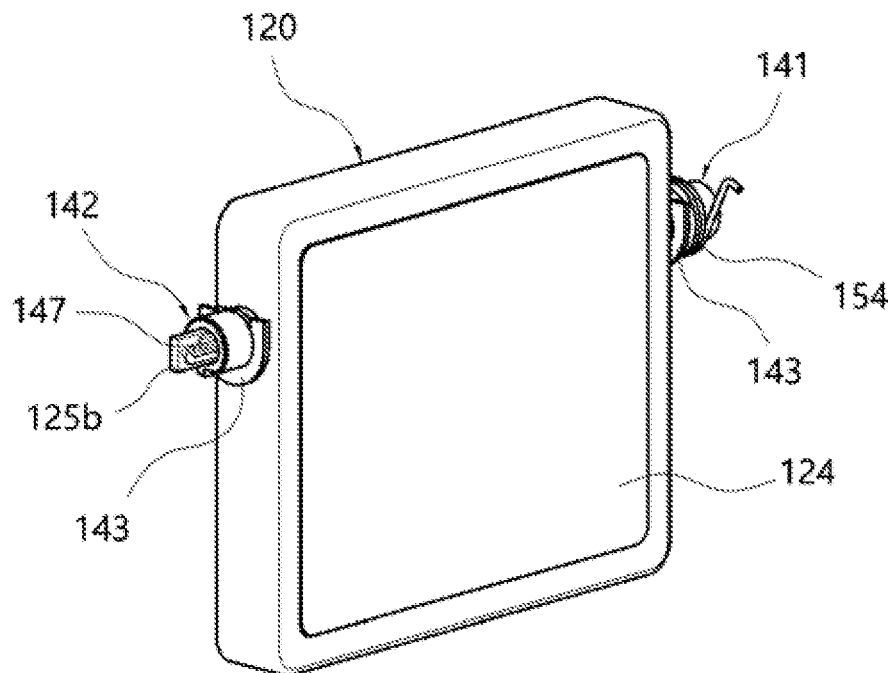
FIGS. 15A-15B show a state in which the mounting member and the rotation shaft are coupled in the vehicle cup holder allowing wireless charging according to the present invention.
Figure 15B:
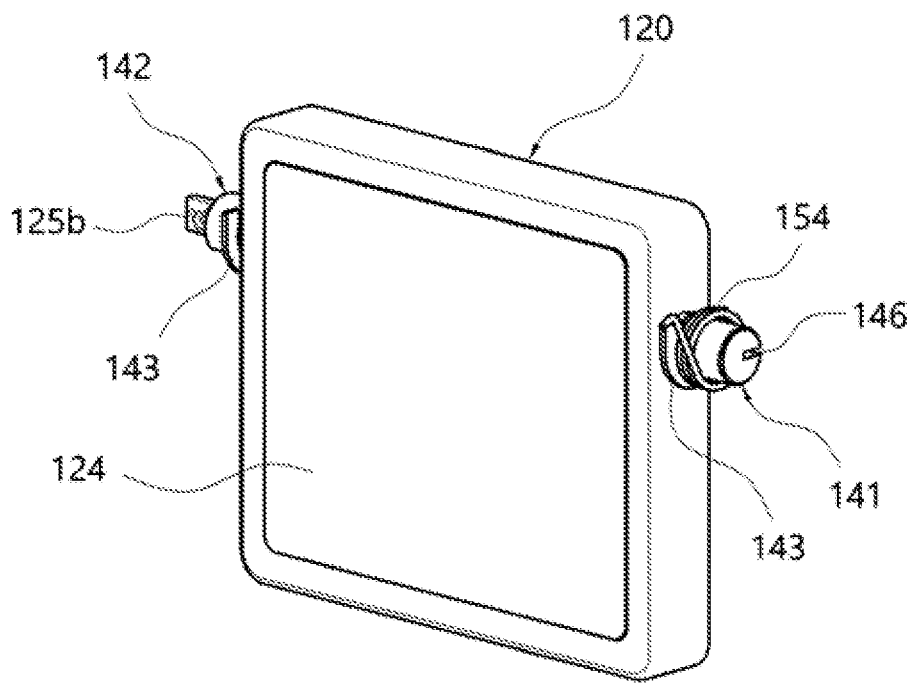
Figure 16A:
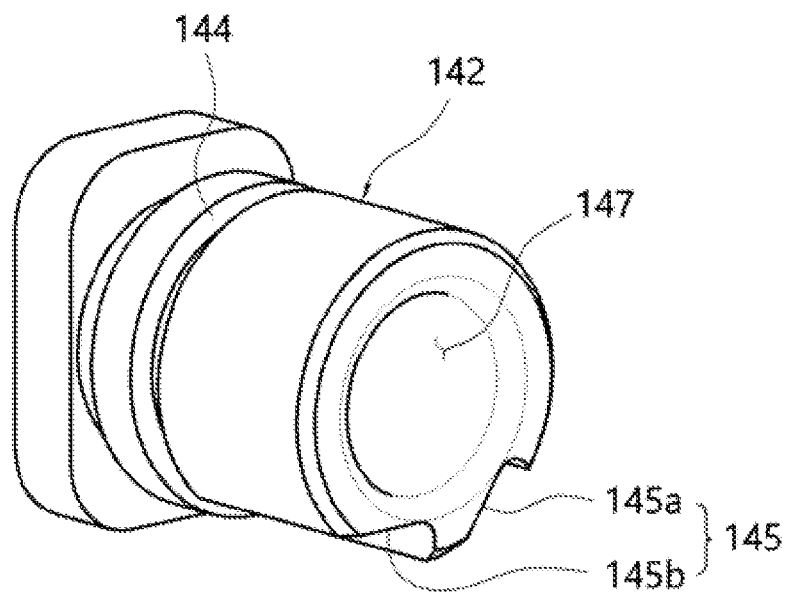
FIGS. 16A-16B show the second rotation shaft applicable to the vehicle cup holder allowing wireless charging according to the present invention.
Figure 16B:
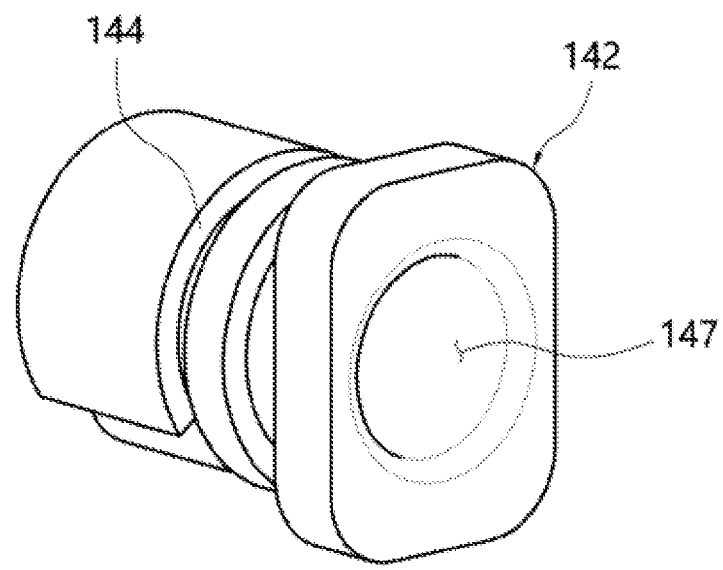

In this case, as shown in FIGS. 16A-16B, the first rotation shaft 141 and the second rotation shaft 142 may include seating grooves 144 that are formed to be recessed at longitudinal middles in a circumferential direction thereof. In this case, as shown in FIGS. 15A-15B, the first rotation shaft 141 and the second rotation shaft 142 may be latched and installed in the sleeve rings 143 through the seating grooves 144.

Thus, in the cup holder 100 or 200 according to one embodiment of the present invention, the first rotation shaft 141 and the second rotation shaft 142 can be prevented from being moved when the mounting member 120 is rotated. Accordingly, in the cup holder 100 or 200 according to one embodiment of the present invention, the mounting member 120 may be stably rotated around the first and second rotation shafts 141 and 142.

In this case, in the cup holder 100 or 200 according to one embodiment of the present invention, the mounting members 120 may include first wireless power transmission modules 130 for wirelessly charging a battery of the portable terminal 10. In this case, the first wireless power transmission modules 130 may be electrically connected to a circuit board 160.

In the present invention, a controller for controlling driving of the first wireless power transmission module 130 may be mounted on the circuit board 160. In addition, the first wireless power transmission module 130 may receive driving power from a battery of a vehicle.

Meanwhile, as shown in FIGS. 3 and 8, the circuit board 160 may be provided separately from the housing 110, and an appropriate number of the circuit boards 160 may be used according to the number and installation position of the first wireless power transmission modules 130.

In addition, the circuit board 160 may be embedded in a housing-shaped cover 162 so as to be prevented from being exposed to the outside. In this case, the cover 162 may be fixed to one side of the housing 110 or may be fixed to another member. However, the arrangement position of the circuit board 160 is not limited thereto and may be appropriately changed according to design conditions.

Thus, in the cup holder 100 or 200 according to one embodiment of the present invention, when the mounting member 120 is converted into the first state in the first accommodation space 111 and the portable terminal 10 is mounted such that one surface thereof is in contact with one surface of the mounting member 120, the battery of the portable terminal 10 may be wirelessly charged using wireless power supplied from the first wireless power transmission module 130.

Accordingly, the cup holder 100 or 200 according to one embodiment of the present invention may implement both of the first function as a holder capable of accommodating a cup, a tumbler, or the like in the first accommodation space 111 and a second function as a wireless charger capable of wirelessly charging a battery of a portable terminal.

Meanwhile, the first wireless power transmission module 130 may be embedded in the mounting member 120. In addition, when the plurality of mounting members 120 are provided, the first wireless power transmission module 130 may be provided separately in each of the plurality of mounting members 120.

To this end, the mounting member 120 may include cases 121 and 122 for accommodating the first wireless power transmission module 130.

As an example, as shown in FIG. 17, the cases may include a first case 121 and a second case 122 that are detachably coupled to each other, and the first wireless power transmission module 130 may be accommodated in an interior space formed through the first case 121 and the second case 122.

Here, the first wireless power transmission module 130 may include a shielding sheet 131 and a wireless power transmission antenna 132 disposed on one surface of the shielding sheet 131. In addition, the shielding sheet 131 may be a magnetic sheet so as to shield a magnetic field generated from the wireless power transmission antenna 132, and the wireless power transmission antenna 132 may be a flat coil.

Since the shielding sheet 131 and the wireless power transmission antenna 132 are well known, detailed descriptions thereof will be omitted.

In this case, at least one protrusion 123 for supporting one surface of the shielding sheet 131 may be formed in the case.

As an example, the at least one protrusion 123 may be formed to protrude from an inner surface of the second case 122. Thus, when the wireless power transmission module 130 is disposed inside the case, the wireless power transmission antenna 132 may maintain a state of being pressed against an inner surface of the first case 121, and the first wireless power transmission module 130 may not be moved inside the case.

Accordingly, when a portable terminal is disposed to be pressed against one surface of the mounting member 120, in detail, an outer surface of the first case 121, it is possible to minimize a spacing distance between the portable terminal and the wireless power transmission antenna 132 embedded in the mounting member 120, and even when shaking occurs during driving of a vehicle, it is possible to prevent a change in position of the first wireless power transmission module 130 embedded in the mounting member 120 due to the shaking of the vehicle.

Thus, in the cup holder 100 or 200 according to one embodiment of the present invention, since power transmission can be smoothly performed even when shaking occurs during driving of a vehicle, wireless charging can be stably performed.

Accordingly, when one surface of the portable terminal is disposed in a state of being pressed against one surface of the mounting member 120, a battery of the portable terminal can be smoothly charged using wireless power transmitted from the first wireless power transmission module 130.

Alternatively, the first wireless power transmission module 130 may be attached to one surface of the mounting member 120 or may be coupled to one surface of the mounting member 120 in a state accommodated in another member.

Meanwhile, when the plurality of first accommodation spaces 111 are provided as shown in FIGS. 1 to 4, the mounting member 120 may be disposed separately in each of the plurality of first accommodation spaces 111.

Although the drawings illustrate that the mounting members 120 are respectively installed in the two first accommodation spaces 111 and the two mounting members 120 are disposed side by side on the same side surfaces of side surfaces of the first accommodation spaces 111, the present invention is not limited thereto, and the two mounting members 120 may be disposed on different side surfaces of the first accommodation spaces 111.

As a non-limiting example, one mounting member 120 may be disposed on one side surface positioned in a direction of a driver seat of the side surfaces of the first accommodation space 111, and the other mounting member 120 may be disposed on one side surface positioned in a direction of a passenger seat of the side surfaces of another first accommodation space 111.

For another example, the plurality of mounting members 120 may be disposed in one first accommodation space 111 and may be disposed to be separately rotated in different directions in the same first accommodation space 111.

Specifically, as shown in FIGS. 7 to 9, the mounting member 120 may include a first mounting member 120a and a second mounting member 120b, and the first mounting member 120a and the second mounting member 120b may be disposed so as to be positioned on opposite surfaces facing each other in one first accommodation space 111.

That is, the first mounting member 120a may be disposed to be rotatable with respect to an inner side surface facing in the direction of the driver seat of side surfaces of the first accommodation space 111, and the second mounting member 120b may be disposed to be rotatable with respect to an inner side surface facing in the direction of the passenger seat of the side surfaces of the first accommodation space 111.

Thus, in the cup holder 200 according to one embodiment of the present invention, any one of the first and second mounting members 120a and 120b may be selectively converted into the first state. Accordingly, a user can mount an object using one mounting member 120a or 120b of the first mounting member 120a and the second mounting member 120b that has been converted into the first state.

Thus, the user can select a direction, in which an object is mounted, as a desired direction, and thus, user convenience can be improved.

As an example, when a driver converts the second mounting member 120b into the first state and then mounts the portable terminal 10 on the second mounting member 120b, the user can easily check a screen of the portable terminal 10 while charging the battery of the portable terminal 10 through the first wireless power transmission module 130 embedded in the second mounting member 120b.

Similarly, when a passenger seated on the passenger seat converts the first mounting member 120a into the first state and then mounts the portable terminal 10 on the first mounting member 120a, the passenger can easily check the screen of the portable terminal 10 while charging the battery of the portable terminal 10 through the first wireless power transmission module 130 embedded in the first mounting member 120a.

However, the installation directions of the first and second mounting members 120a and 120b are not limited to the opposite surfaces facing each other, and when the first and second mounting members 120a and 120b can be separately rotated in different directions, the first and second mounting members 120a and 120b may be installed on two adjacent side surfaces other than the opposite surfaces facing each other.

The operation member 150 may allow or restrict the rotation of the first rotation shaft 141 and the second rotation shaft 142. Thus, the operation member 150 may maintain the mounting member 120 in one state of the first state and the second state and may convert the mounting member 120 from the first state to the second state or from the second state to the first state.

That is, the operation member 150 may maintain the mounting member 120 in the first state disposed to be inclined at an acute angle θ with respect to the bottom surface or side surface of the first accommodation space 111 or may maintain the mounting member 120 in the second state disposed parallel to the side surface of the first accommodation space 111.

Figure 12:
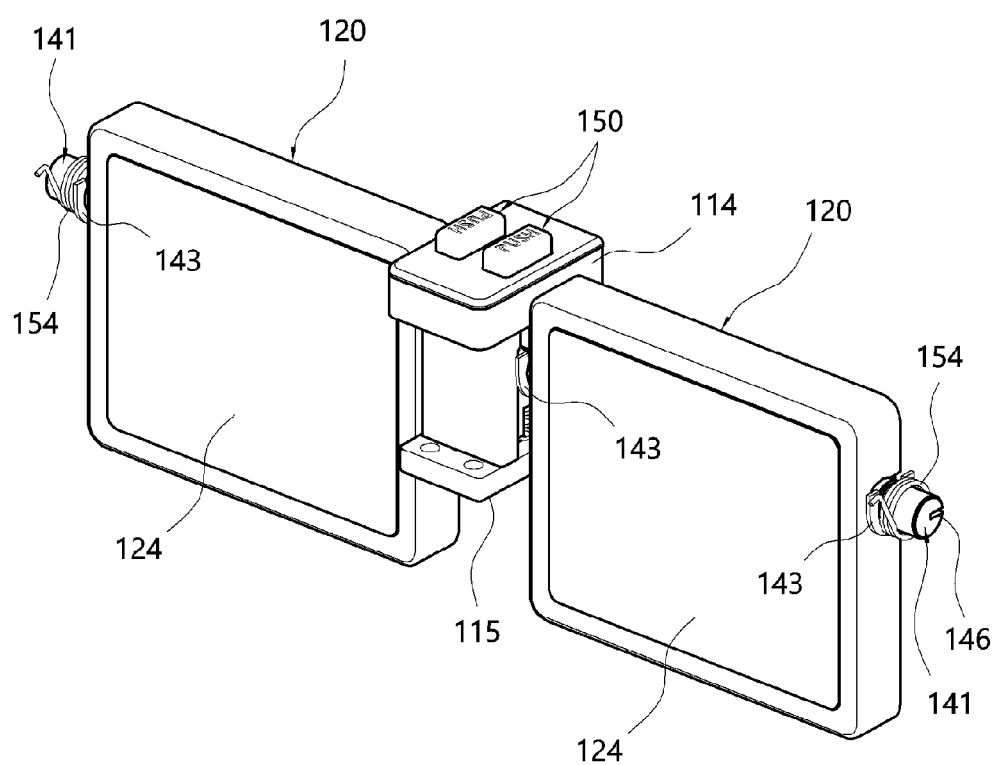
FIG. 12 is a view illustrating a coupling relationship between a mounting member, a rotation shaft, and a push button in the vehicle cup holder allowing wireless charging according to the present invention.
Figure 13:
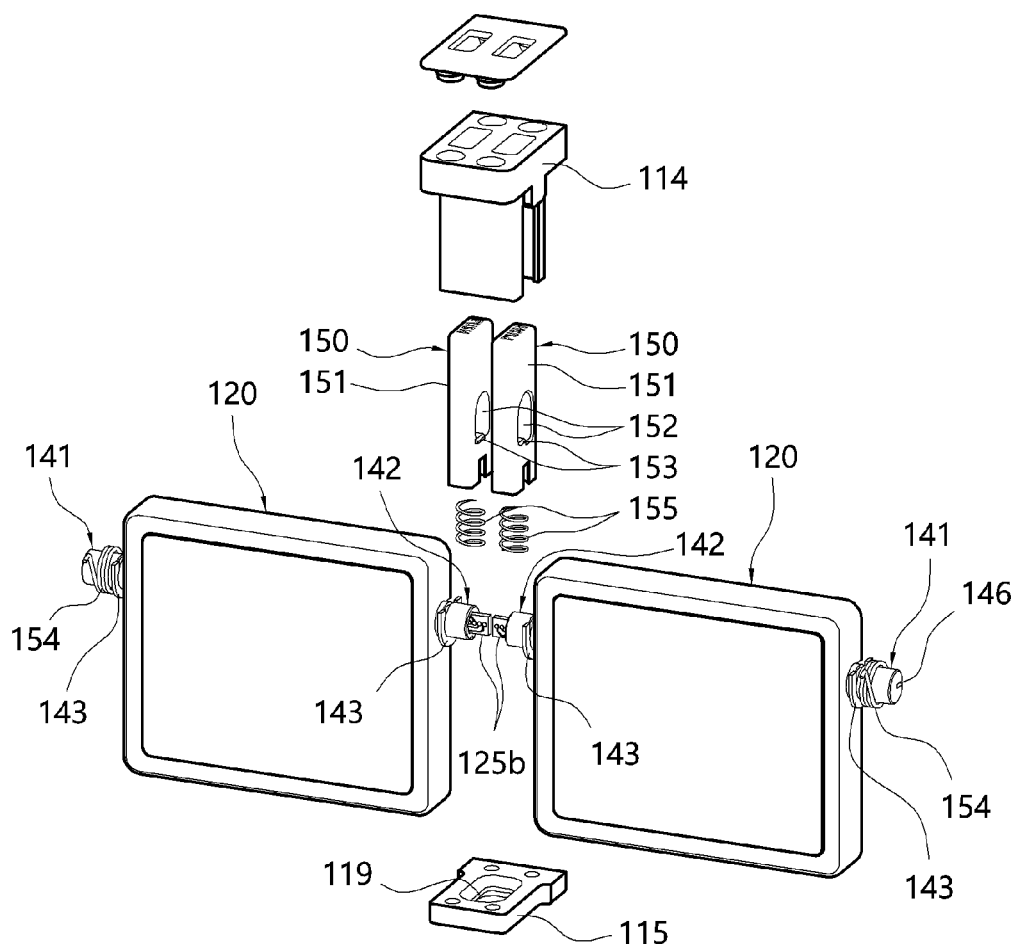
FIG. 13 is an exploded view of FIG. 12.
Figure 14:
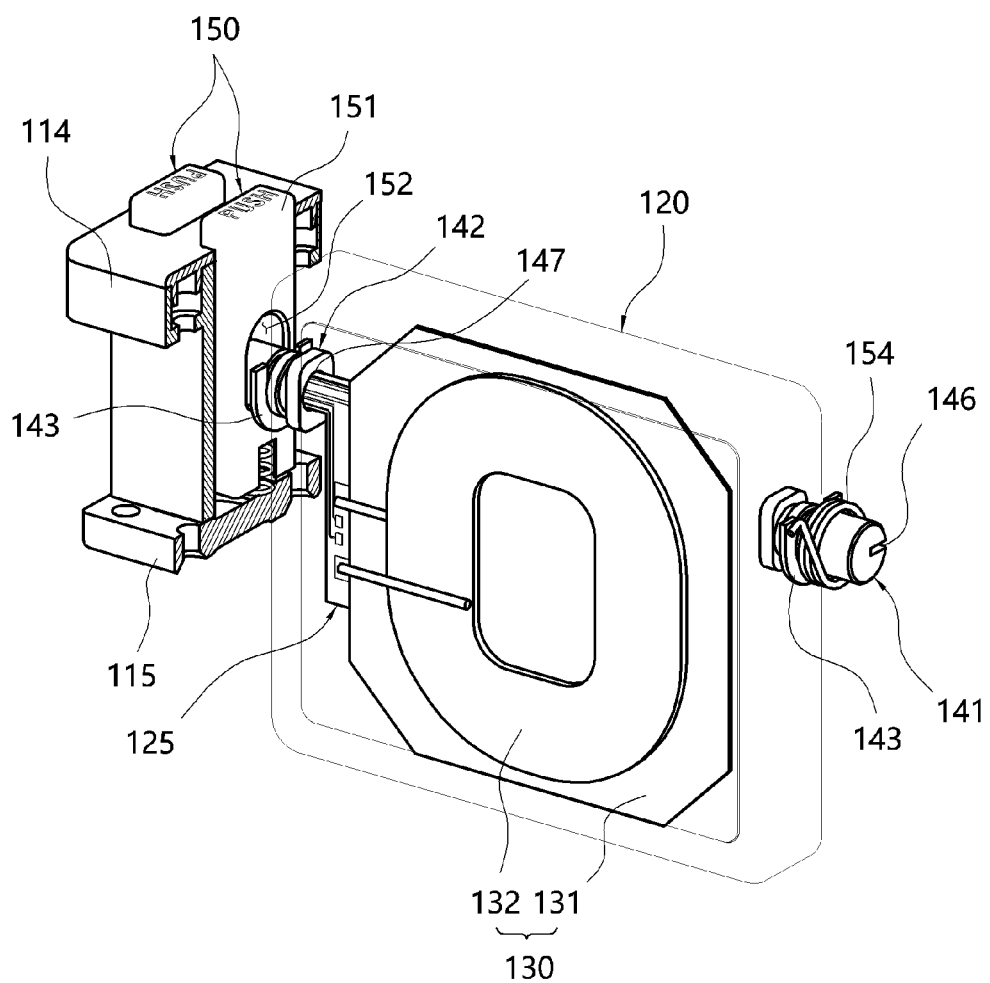
FIG. 14 is a view illustrating a coupling relationship between the push button and a second rotation shaft in the vehicle cup holder allowing wireless charging according to the present invention.

To this end, as shown in FIGS. 12 to 14, the operation member 150 may include a push button 151 slidably coupled to the housing, a long through-hole 152 formed to pass through the button 151 such that the second rotation shaft 142 passes therethrough, and a stepped portion 153 formed on an inner circumferential surface of the through-hole 152 such that a portion of the second rotation shaft 142 is selectively latched and installed.

In this case, the push button 151 may be coupled to the housing 110 through a holder member 114. The push button 151 may slide in a height direction of the holder member 114. In addition, a spring member 155 for pressing the push button 151 in one direction may be disposed at a lower side of the push button 151. That is, a support member 115 may be coupled to the lower side of the holder member 114, and the spring member 155 may be disposed such that both ends thereof are in contact with the push button 151 and the support member 115.

Accordingly, when the user presses the push button 151 downward, the spring member 155 may be compressed to store an elastic force, and when an external force is removed, the spring member 155 may use the stored elastic force to press the push button 151 upward.

In this case, the rotation of the first and second rotation shafts 141 and 142 may be associated with the sliding movement of the push button 151.

To this end, the cup holder 100 or 200 according to one embodiment of the present invention may include a torsion spring 154 coupled on the first rotation shaft 141 and a plurality of cutout portions 145 formed in the second rotation shaft 142.

In this case, the torsion spring 154 may provide an elastic force to rotate the first rotation shaft 141 in one direction, and any one of the plurality of cutout portions 145 may be selectively coupled to the stepped portion 153.

That is, the torsion spring 154 may provide an elastic force to rotate the mounting member 120 in a direction away from the side surface of the first accommodation space 111. To this end, one end portion of the torsion spring 154 may be fitted into a fitting groove 146 formed to be cut in an end portion of the first rotation shaft 141, and the opposite other end portion thereof may be supported on one side of the housing 110.

In addition, the plurality of cutout portions 145 may be formed to be cut inward along an outer circumferential surface of the second rotation shaft 142, and the plurality of cutout portions 145 may be formed such that at least some thereof are engaged with the stepped portion 153. Thus, when any one of the plurality of cutout portions 145 is engaged with the stepped portion 153, the second rotation shaft 142 may be restricted from being rotated in one direction.

In this case, as shown in FIGS. 16A-16B, the plurality of cutout portions 145 may include a first cutout portion 145a and a second cutout portion 145b, and the first cutout portion 145a and the second cutout portion 145b may be selectively coupled to the stepped portion 153.

In addition, the first cutout portion 145a and the second cutout portion 145b may each include a vertical surface and an inclined surface so as to allow a movement of the stepped portion 153 in one direction and restrict a movement of the stepped portion 153 in an opposite direction when being coupled to the stepped portion 153.

Thus, the first cutout portion 145a may coupled to the stepped portion 153 to maintain the mounting member 120 in the first state, and the second cutout portion 145b may be coupled to the stepped portion 153 to maintain the mounting member 120 in the second state.

Figure 18:
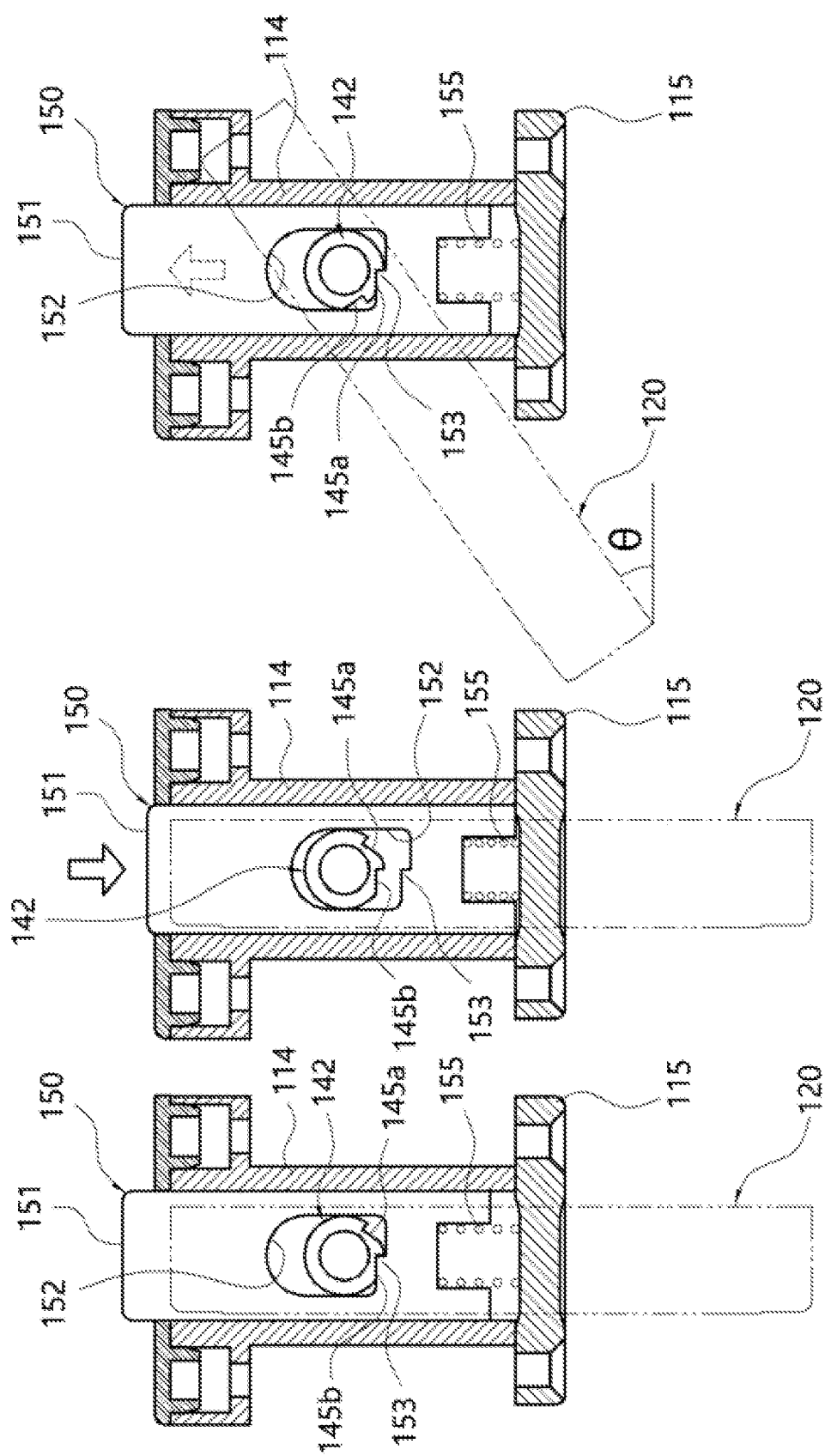
FIG. 18A-18C show an operating state view illustrating a process in which the mounting member is converted from a second state to a first state in the vehicle cup holder allowing wireless charging according to the present invention.

That is, in the cup holder 100 or 200 according to one embodiment of the present invention, as shown in FIGS. 18A and 18B, in a state in which the mounting member 120 is disposed in the second state, when the push button 151 is moved downward, the second cutout portion 145b may be released from a state of being engaged with the stepped portion 153 and released from a state of being caught by the stepped portion 153.

Thus, the second rotation shaft 142 may be rotated in a direction in which the first cutout portion 145a moves toward the stepped portion 153 by using an elastic force provided by the torsion spring 154. At the same time, the spring member 155 may be pressed and compressed through the push button 151 to store an elastic force.

Then, as shown in FIG. 18C, when an external force pressing the push button 151 downward is removed, the push button 151 may be moved upward by the elastic force stored in the spring member 155.

Thus, the stepped portion 153 may be engaged with the first cutout portion 145a and latched and installed at the first cutout portion 145a. Accordingly, even when an elastic force is provided to the second rotation shaft 142 from the torsion spring 154, the rotation of the second rotation shaft 142 may be restricted by the stepped portion 153. As a result, the mounting member 120 may be maintained in the second state.

Figure 19:
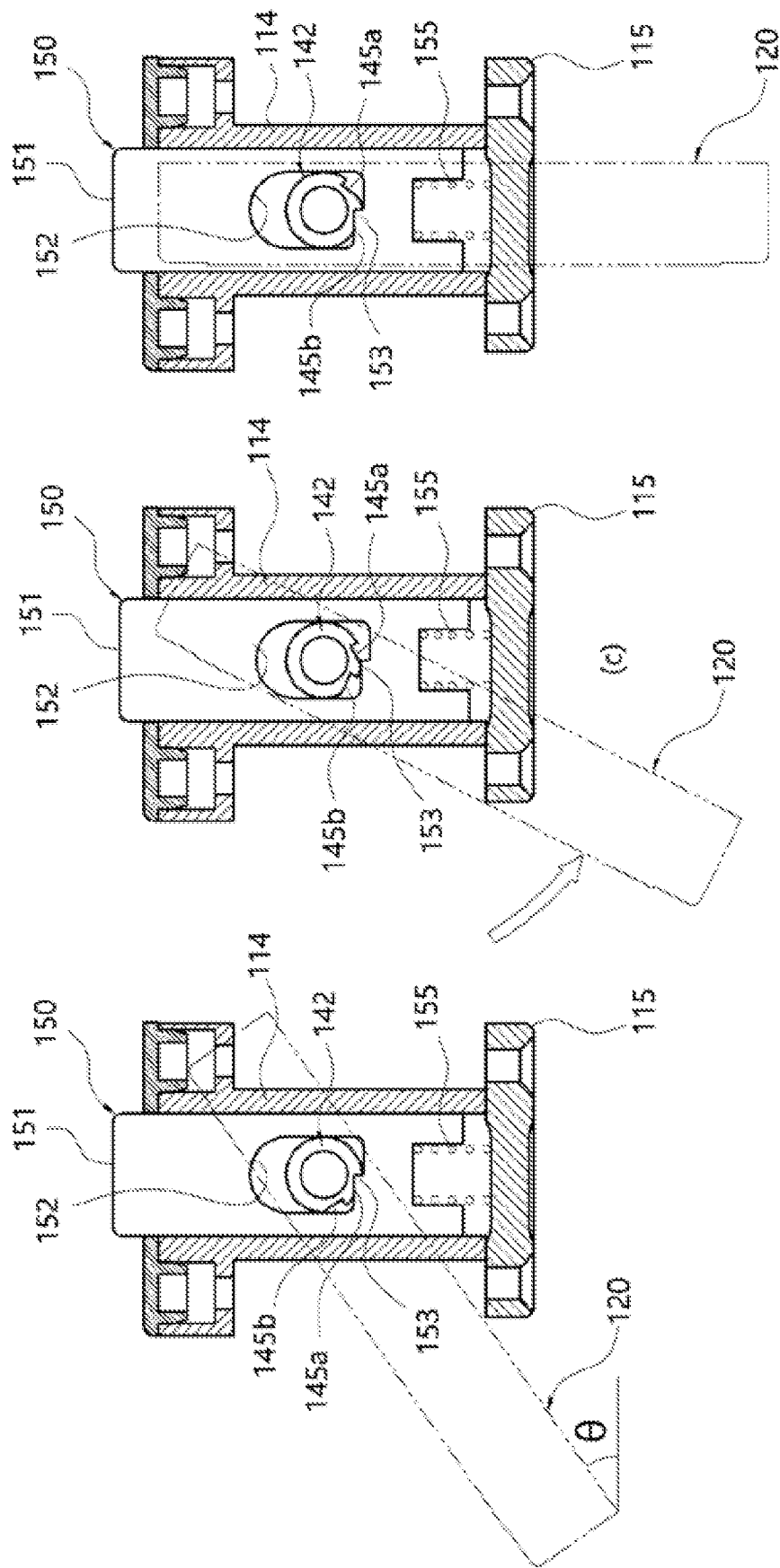
FIG. 19A-19C show an operating state view illustrating a process in which the mounting member is converted from the first state to the second state in the vehicle cup holder allowing wireless charging according to the present invention.

Similarly, in the cup holder 100 or 200 according to one embodiment of the present invention, as shown in FIG. 19A, in a state in which the mounting member 120 is maintained in the first state, when the user presses the mounting member 120 toward the inner side surface of the first accommodation space 111, the mounting member 120 may be rotated about the first rotation shaft 141 and the second rotation shaft 142, and the stepped portion 153 may be moved from the first cutout portion 145a to the second cutout portion 145b by a pressing force.

Thus, the first rotation shaft 141 and the second rotation shaft 142 may be rotated together according to the rotation of the mounting member 120, and as shown in FIG. 19B, the push button 151 may be pressed downward through the stepped portion 153 moved from the first cutout portion 145a to the second cutout portion 145b. At the same time, the spring member 155 may be compressed by a pressure applied from the push button 151 to store an elastic force.

Then, when the stepped portion 153 is completely moved to the second cutout portion 145b, an external force applied to the push button 151 from the stepped portion 153 may be removed, and the push button 151 may move upward due to the elastic force stored in the spring member 155.

Thus, as shown in FIG. 19C, the stepped portion 153 may be engaged with the second cutout portion 145b and latched and installed at the second cutout portion 145b. Accordingly, the mounting member 120 may be maintained in the second state in the first accommodation space 111.

As described above, in the cup holder 100 or 200 according to one embodiment of the present invention, when the mounting member 120 is in the first state, the push button 151 may be operated, and when the mounting member 120 is in the second state, the mounting member 120 may be pressed, thereby converting the position of the mounting member 120 between the first state and the second state.

Thus, in the cup holder 100 or 200 according to one embodiment of the present invention, a state of the mounting member 120 may be freely converted into the first state in which a battery of a portable terminal may be wirelessly charged or may be freely converted into the second state in which an object may be accommodated in the first accommodation space 111.

Accordingly, the cup holder 100 or 200 according to one embodiment of the present invention may smoothly perform both the first function as a cup holder of accommodating an object such as a cup or a tumbler and the second function as a wireless charger of charging a battery of a portable terminal.

In this case, as shown in FIGS. 3 and 8, the housing 110 may include one or more inclined surfaces 118 formed at edges of the first accommodation spaces 111 so as to be inclined at a predetermined angle. As an example, the inclined surface 118a may be formed to have the same angle as an angle formed by the bottom surface of the first accommodation space 111 and one surface of the mounting member 120 in the first state.

Thus, when the mounting member 120 is converted into the first state, the inclined surface 118a may come into contact with one surface of the mounting member 120.

Accordingly, when the mounting member 120 is converted from the second state to the first state through the user's operation of the push button 151, one surface of the mounting member 120 comes into contact with the inclined surface 118a, and thus, the rotation angle of the second rotation shaft 142 rotating through an elastic force provided from the torsion spring 154 may be limited. As a result, the mounting member 120 may be smoothly converted from the second state to the first state.

Here, in a case in which the plurality of mounting members 120 are disposed in the first accommodation spaces 111, the inclined surfaces 118 may be provided to correspond to the plurality of mounting members 120, respectively.

In the present invention, the operation members 150 may be provided to correspond to the mounting members 120, respectively. That is, when the plurality of mounting members are each rotatably installed in one first accommodation space 111, the operation members 150 may be provided in the housing 110 so as to correspond to the plurality of mounting members each rotatably installed in one first accommodation space 111, respectively.

In addition, when the plurality of first accommodation spaces 111 are formed in the housing 110, the operation members 150 may also be provided so as to correspond to the plurality of first accommodation spaces as well as the mounting members disposed in the first accommodation spaces, respectively.

Meanwhile, the cup holder 100 or 200 according to one embodiment of the present invention may further include second wireless power transmission modules 180. The second wireless power transmission module 180 may be disposed at a position corresponding to the bottom surface of the first accommodation space 111.

That is, the second wireless power transmission module 180 may be embedded in the bottom surface of the first accommodation space 111.

Figure 5:
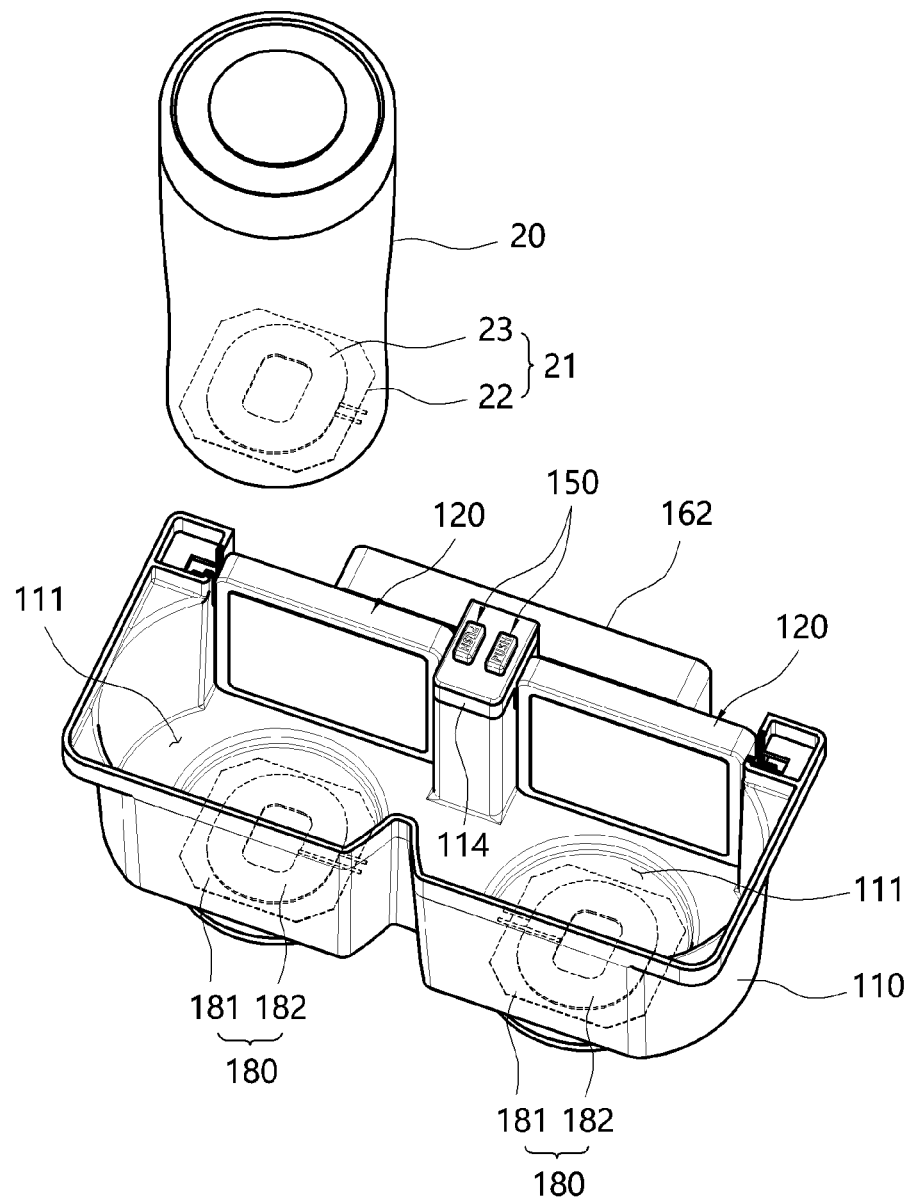
FIG. 5 is a view illustrating a state in which a wireless power transmission module is embedded in a bottom surface of an accommodation space in FIG. 1.
Figure 10:
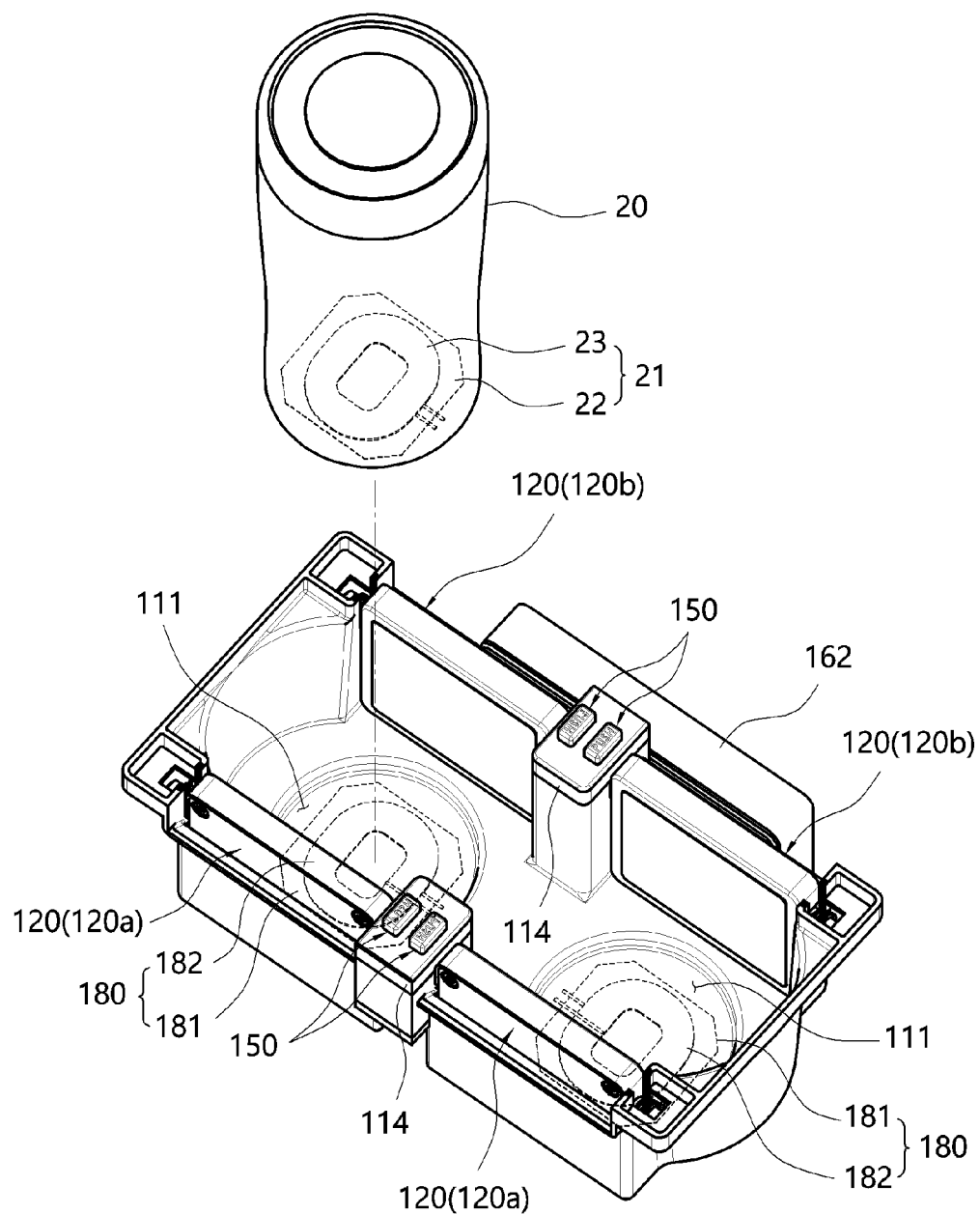
FIG. 10 is a view illustrating a state in which a wireless power transmission module is embedded in a bottom surface of an accommodation space in FIG. 7.

As an example, as shown in FIGS. 5 and 10, the second wireless power transmission module 180 may be embedded in a lower surface of the housing 110.

Figure 6:
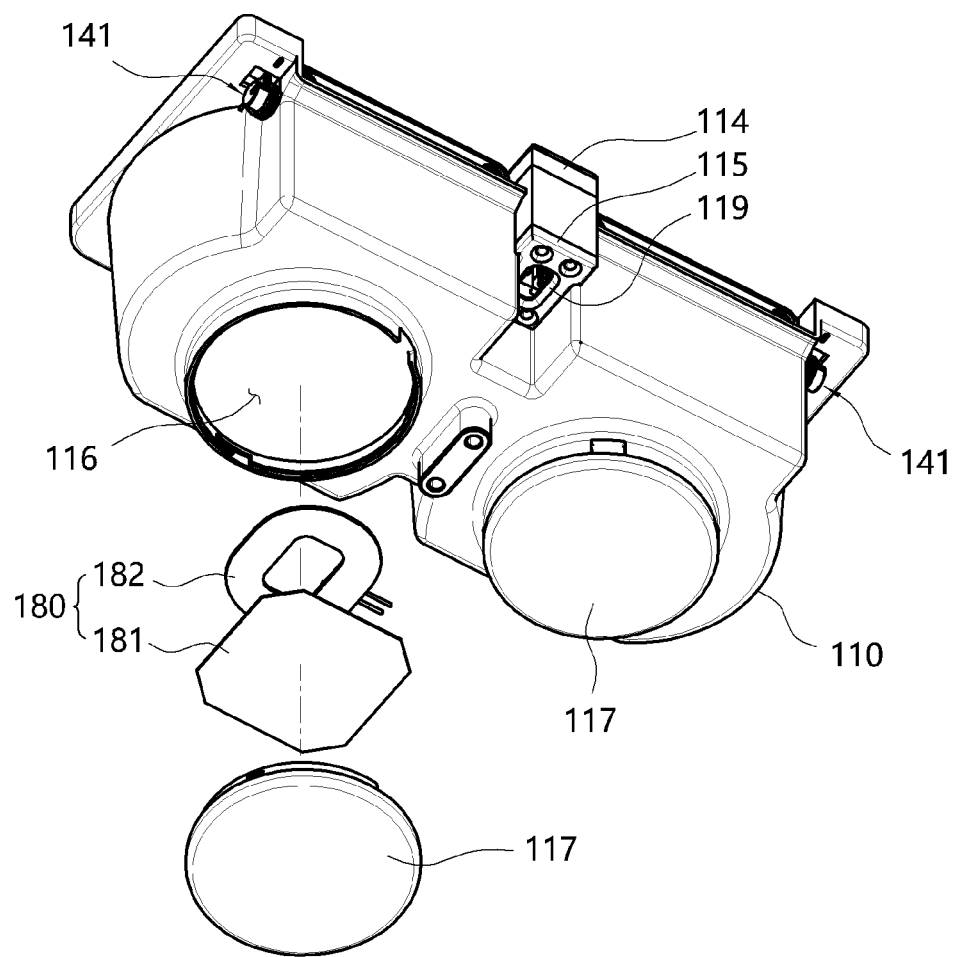
FIG. 6 is a view in which a cover member is separated in FIG. 5.
Figure 11:
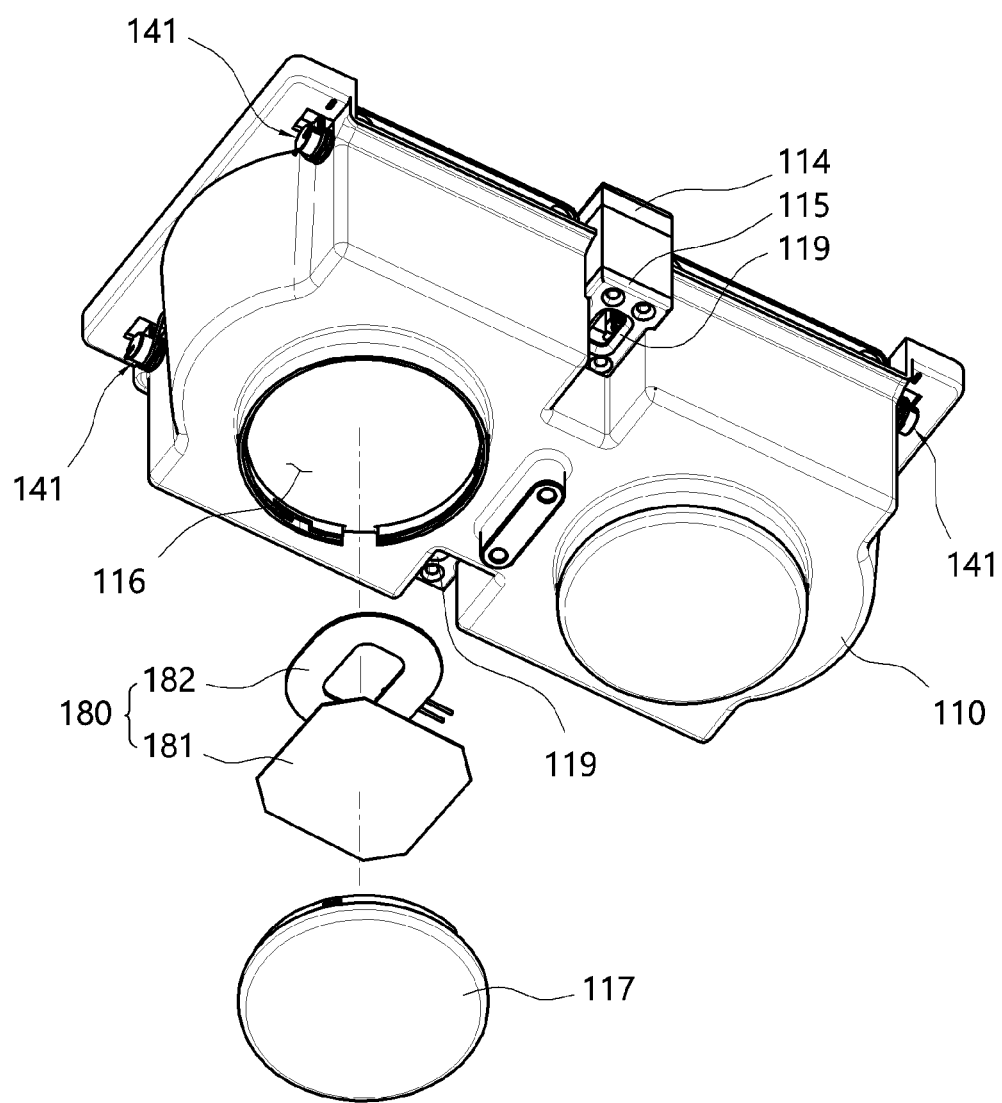
FIG. 11 is a view in which a cover member is separated in FIG. 10.

To this end, as shown in FIGS. 6 and 11, the housing 110 may have a second accommodation space 116 for accommodating the second wireless power transmission module 180, which is formed in the lower surface of the housing 110 corresponding to the bottom surface of the first accommodation space 111.

In addition, the second accommodation space 116 may have a lower portion formed to be open such that the second wireless power transmission module 180 may be inserted therein, and the open lower portion of the second accommodation space 116 may be sealed through a cover member 117 detachably coupled to the housing 110.

When an object capable of receiving wireless power is accommodated in the first accommodation space 111 in a state in which the mounting member 120 is disposed in the second state, the second wireless power transmission module 180 may transmit wireless power to the object.

As an example, when a cup having a function of heating contents by wirelessly receiving power is accommodated in the first accommodation space 111, the cup may receive power from the second wireless power transmission module 180 to heat the contents.

As a non-limiting example, the cup may be a known wireless heating tumbler, and as shown in FIGS. 5 and 10, the wireless heating tumbler may include a wireless power reception module 21 capable of receiving power from the second wireless power transmission module 180.

Here, similar to the first wireless power transmission module 130 embedded in the mounting member 120, the second wireless power transmission module 180 may include a shielding sheet 181 and a wireless power transmission antenna 182 and may be electrically connected to the circuit board 160.

In addition, the wireless power reception module 21 may include a shielding sheet 22 and a wireless power transmission antenna 23 disposed on one surface of the shielding sheet 22.

Thus, the cup holder 100 or 200 according to one embodiment of the present invention may wirelessly charge a battery of a portable terminal through the first wireless power transmission module 130 and may supply power to the wireless heating tumbler accommodated in the first accommodation space 111 through the second wireless power transmission module 180.

In addition, various control circuits for controlling the first wireless power transmission module 130 and the second wireless power transmission module 180 may be mounted on the circuit board 160.

Meanwhile, the first wireless power transmission module 130 may be electrically connected to the circuit board 160 through a connection board 125 embedded in the mounting member 120.

In this case, the connection board 125 may be provided such that a portion thereof is exposed inside the holder member 114 through the second rotation shaft 142.

As an example, the second rotation shaft 142 may include a first through-hole 147 formed to pass therethrough in a length direction thereof, and the connection board 125 may include a first part 125a embedded in the mounting member 120 and a second part 125b disposed to extend from the first part 125a and to pass through the first through-hole 147. A partial length of the second part 125b may pass through the first through-hole 147 and then protrude outward from an end portion of the second rotation shaft 142.

In this case, both end portions of the wireless power transmission antenna 132 may be connected to the first part 125a of the connection board 125, and as shown in FIGS. 3 and 8, end portions of cables C may be connected to the second part 125b of the connection board 125.

In this case, as shown in FIGS. 6 and 11, the support member 115 may have second through-holes 119, through which the cables C may pass, formed therein.

Accordingly, the cable C for electrically connecting the circuit board 160 and the connection board 125 may pass through the second through-hole 119 and then may be smoothly connected to the second part 125b of the connection board 125 protruding inside the holder member 114.

Thus, the connection board 125 may be electrically connected to the circuit board 160 through the cable C.

For this reason, in the cup holder 100 or 200 according to one embodiment of the present invention, even when the second rotation shaft 142 is rotated, the connection board 125 may be smoothly connected to the circuit board 160 through the cable C regardless of the rotational movement of the second rotation shaft 142, and the possibility for the cable C to be disconnected can be significantly reduced.

In addition, the cup holder 100 or 200 according to one embodiment of the present invention may facilitate a wiring operation of the cable C for electrically connecting the circuit board 160 and the first wireless power transmission module 130.

The cup holder 100 or 200 according to one embodiment of the present invention described above may be installed inside a vehicle.

Figure 20:
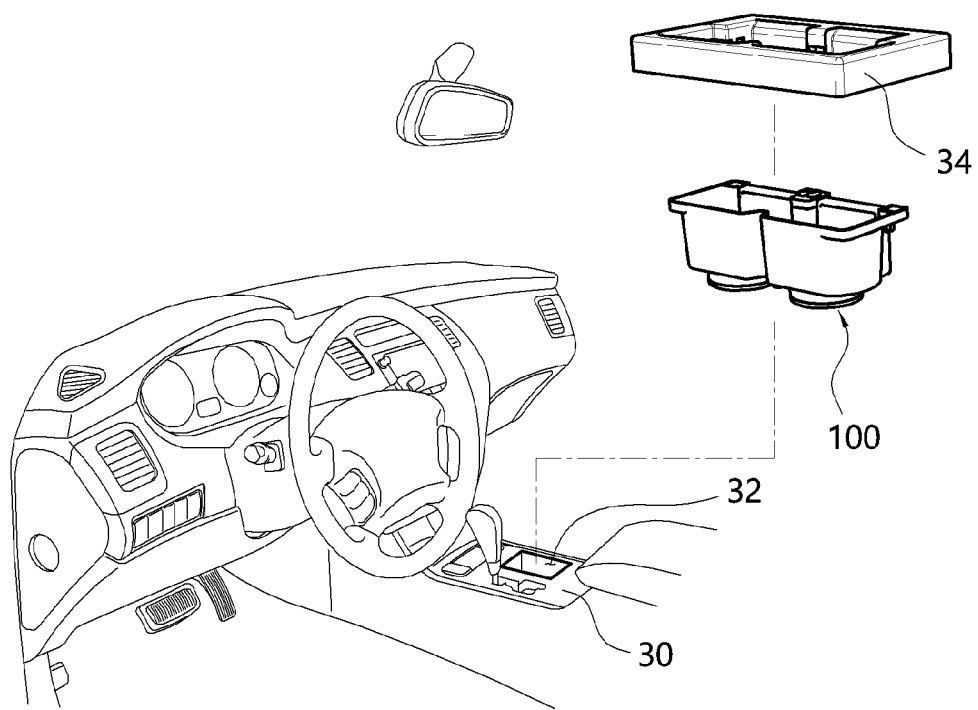
FIG. 20 is a use state view of the vehicle cup holder allowing wireless charging according to the present invention.

As an example, as shown in FIG. 20, the cup holder 100 or 200 according to one embodiment of the present invention may be installed in a console box 30 of a vehicle That is, as shown in FIG. 20, the console box 30 of the vehicle may have a mounting space 32, in which the cup holder 100 or 200 according to one embodiment of the present invention may be accommodated, formed therein, and a cover member 34 for covering the mounting space 32 may be coupled to an upper side of the console box 30.

Accordingly, the cup holder 100 or 200 may be insertion-disposed in the mounting space 32 in a state in which one side thereof is fixed to the cover member 34. In this case, the cover 162 in which the circuit board 160 is embedded may also be fixed to the cover member 34, and the circuit board 160 may be electrically connected to a battery of the vehicle.

For this reason, the cup holder 100 or 200 according to one embodiment of the present invention can replace a conventional cup holder installed in the known console box 30.

However, the mounting method and mounting position of the cup holder 100 or 200 according to one embodiment of the present invention are not limited thereto, and the cup holder 100 or 200 may be installed in various positions other than the above-described console box as long as the cup holder 100 or 200 is disposed inside the vehicle.

While the embodiments of the present invention have been described above, the present invention is not limited to the embodiment presented herein. One skilled in the art may easily suggest other embodiments due to addition, modification, deletion, and the like of components within the scope and spirit of the present invention, and the addition, modification, deletion, and the like of the components fall within the scope and spirit of the present invention.

The invention claimed is:
1. A vehicle cup holder allowing wireless charging, comprising:
a housing which has an accommodation space, in which an object including a portable terminal is accommodated, formed therein;

a mounting member which is coupled to the housing through a rotation shaft so as to be rotatable in the accommodation space and which includes a wireless power transmission module configured to wirelessly charge a battery of the portable terminal; and an operation member which allows or restricts rotation of the rotation shaft to maintain the mounting member in a first state in which the battery of a the portable terminal is charged or maintain the mounting member in a second state in which the object is accommodated in the accommodation space, wherein the rotation shaft includes a first rotation shaft and a second rotation shaft which protrude outward from both sides of the mounting member by a predetermined length, the housing includes a plurality of locking grooves formed such that partial lengths of the first and second rotation shafts are inserted therein, and the first rotation shaft and the second rotation shaft are latched and installed in sleeve rings mounted in the housing.

2. The vehicle cup holder of claim 1, wherein the first state is a state in which the mounting member is disposed to be inclined at an acute angle with respect to a bottom surface or a side surface of the accommodation space such that one surface of the mounting member supports one surface of the portable terminal, and the second state is a state in which the mounting member is disposed parallel to the side surface of the accommodation space such that the object is inserted into the accommodation space.

3. The vehicle cup holder of claim 1, wherein the mounting member includes a first mounting member and a second mounting member which are separately rotated in different directions in the accommodation space.

4. The vehicle cup holder of claim 3, wherein the first and second mounting members are disposed to be positioned on opposite surfaces facing each other in the accommodation space.

5. The vehicle cup holder of claim 1, wherein the sleeve ring is installed in the locking groove such that a portion thereof protrudes inside the locking grove along the locking groove.

6. The vehicle cup holder of claim 1, wherein the sleeve ring has an opening of which one side is open, and circumference surfaces of the first rotation shaft and the second rotation shaft are partially supported directly by inner surfaces of the sleeve rings protruding inside the locking grooves.

7. The vehicle cup holder of claim 1, wherein the first rotation shaft and the second rotation shaft include seating grooves recessed inward in a circumferential direction thereof, and the first and second rotation shafts are latched and installed in the sleeve rings through the seating grooves.

8. The vehicle cup holder of claim 1, wherein the operation member includes a push button slidably coupled to the housing, a through-hole, through which the second rotation shaft passes, formed to pass through the push button, and a stepped portion formed on an inner circumferential surface of the through-hole such that a portion of the second rotation shaft is selectively latched and installed.

9. The vehicle cup holder of claim 8, further comprising a spring member configured to press the push button in one direction.

10. The vehicle cup holder of claim 8, further comprising a torsion spring coupled to the first rotation shaft so as to provide an elastic force for rotating the first rotation shaft in one direction.

11. The vehicle cup holder of claim 8, further comprising a plurality of cutout portions formed to be cut inward along an outer circumferential surface of the second rotation shaft, wherein the stepped portion is engaged with any one of the plurality of cutout portions to restrict rotation of the second rotation shaft in one direction.

12. The vehicle cup holder of claim 1, further comprising another wireless power transmission module embedded in a bottom surface of the accommodation space, wherein, in a state in which the mounting member maintains the second state, the another wireless power transmission module transmits wireless power to the object inserted into the accommodation space.

13. A vehicle cup holder allowing wireless charging, comprising:

a housing which has an accommodation space, in which an object including a portable terminal is accommodated, formed therein;

a mounting member which is coupled to the housing through a rotation shaft so as to be rotatable in the accommodation space and which includes a wireless power transmission module configured to wirelessly charge a battery of the portable terminal; and an operation member which allows or restricts rotation of the rotation shaft to maintain the mounting member in a first state in which the battery of a the portable terminal is charged or maintain the mounting member in a second state in which the object is accommodated in the accommodation space, wherein the mounting member includes a case having an interior space in which the wireless power transmission module is disposed, and a connection board disposed in the interior space and electrically connected to the wireless power transmission module, the rotation shaft has a through-hole formed to pass therethrough in a length direction thereof, and the connection board includes a first part disposed in the interior space and a second part disposed to pass through the through-hole such that a portion thereof is exposed to the outside and a cable is connected thereto.

14. The vehicle cup holder of claim 13, wherein mounting member includes at least one protrusion protruding from an inner surface of the case so as to support one surface of the wireless power transmission module.

15. A vehicle cup holder allowing wireless charging, comprising:

a housing which has an accommodation space, in which an object including a portable terminal is accommodated, formed therein;

a mounting member which is coupled to the housing through a rotation shaft so as to be rotatable in the accommodation space and which includes a wireless power transmission module configured to wirelessly charge a battery of the portable terminal; and an operation member which allows or restricts rotation of the rotation shaft to maintain the mounting member in a first state in which the battery of a the portable terminal is charged or maintain the mounting member in a second state in which the object is accommodated in the accommodation space, wherein the housing includes an inclined surface formed to be inclined at a predetermined angle at an edge of the accommodation space so as to be in contact with one surface of the mounting member in the first state to limit a rotation angle of the mounting member.

\* \* \* \* \*